(12) United States Patent
Zhang et al.

(10) Patent No.: US 10,310,886 B2
(45) Date of Patent: *Jun. 4, 2019

(54) NETWORK CONTROL SYSTEM FOR CONFIGURING MIDDLEBOXES

(71) Applicant: Nicira, Inc., Palo Alto, CA (US)

(72) Inventors: Ronghua Zhang, San Jose, CA (US); Teemu Koponen, IV, San Francisco, CA (US); Pankaj Thakkar, Santa Clara, CA (US); Amar Padmanabhan, Menlo Park, CA (US); Martin Casado, Portola Valley, CA (US)

(73) Assignee: NICIRA, INC., Palo Alto, CA (US)

( * ) Notice: Subject to any disclaimer, the term of this patent is extended or adjusted under 35 U.S.C. 154(b) by 47 days.

This patent is subject to a terminal disclaimer.

(21) Appl. No.: 15/398,709

(22) Filed: Jan. 4, 2017

(65) Prior Publication Data
US 2017/0126493 A1    May 4, 2017

Related U.S. Application Data

(63) Continuation of application No. 14/595,195, filed on Jan. 12, 2015, now Pat. No. 9,558,027, which is a
(Continued)

(51) Int. Cl.
*H04L 12/24* (2006.01)
*H04L 12/741* (2013.01)
(Continued)

(52) U.S. Cl.
CPC .......... *G06F 9/45558* (2013.01); *H04L 41/08* (2013.01); *H04L 41/0803* (2013.01);
(Continued)

(58) Field of Classification Search
None
See application file for complete search history.

(56) References Cited

U.S. PATENT DOCUMENTS

| | | |
|---|---|---|
| 5,473,771 A | 12/1995 | Burd et al. |
| 5,504,921 A | 4/1996 | Dev et al. |

(Continued)

FOREIGN PATENT DOCUMENTS

| | | |
|---|---|---|
| AU | 2012340383 | 4/2014 |
| AU | 2012340387 | 4/2014 |

(Continued)

OTHER PUBLICATIONS

Author Unknown, "Enabling Service Chaining on Cisco Nexus 1000V Series," Month Unknown 2012, 25 pages, CISCO.
(Continued)

*Primary Examiner* — Candal Elpenord
(74) *Attorney, Agent, or Firm* — Adeli LLP

(57) ABSTRACT

Some embodiments provide a method for configuring a logical middlebox in a hosting system that includes a set of nodes. The logical middlebox is part of a logical network that includes a set of logical forwarding elements that connect a set of end machines. The method receives a set of configuration data for the logical middlebox. The method uses a stored set of tables describing physical locations of the end machines to identify a set of nodes at which to implement the logical middlebox. The method provides the logical middlebox configuration for distribution to the identified nodes.

18 Claims, 10 Drawing Sheets

Related U.S. Application Data continuation of application No. 13/678,485, filed on Nov. 15, 2012, now Pat. No. 8,966,029.

(60) Provisional application No. 61/560,279, filed on Nov. 15, 2011.

(51) Int. Cl.

| | | |
|---|---|---|
| *G06F 9/455* | (2018.01) | |
| *H04L 29/06* | (2006.01) | |
| *H04L 12/931* | (2013.01) | |
| *H04L 29/08* | (2006.01) | |
| *H04L 29/12* | (2006.01) | |
| *H04L 12/715* | (2013.01) | |
| *H04L 12/751* | (2013.01) | |
| *H04L 12/933* | (2013.01) | |

(52) U.S. Cl.
CPC ...... *H04L 41/0806* (2013.01); *H04L 41/0813* (2013.01); *H04L 41/0823* (2013.01); *H04L 41/0889* (2013.01); *H04L 41/0893* (2013.01); *H04L 41/12* (2013.01); *H04L 45/64* (2013.01); *H04L 49/70* (2013.01); *H04L 61/256* (2013.01); *H04L 61/2517* (2013.01); *H04L 61/2521* (2013.01); *H04L 63/0218* (2013.01); *H04L 67/1008* (2013.01); *G06F 2009/4557* (2013.01); *G06F 2009/45595* (2013.01); *H04L 45/02* (2013.01); *H04L 49/15* (2013.01)

(56) References Cited

U.S. PATENT DOCUMENTS

| | | |
|---|---|---|
| 5,550,816 A | 8/1996 | Hardwick et al. |
| 5,729,685 A | 3/1998 | Chatwani et al. |
| 5,751,967 A | 5/1998 | Raab et al. |
| 5,796,936 A | 8/1998 | Watabe et al. |
| 6,092,121 A | 7/2000 | Bennett et al. |
| 6,104,699 A | 8/2000 | Holender et al. |
| 6,219,699 B1 | 4/2001 | McCloghrie et al. |
| 6,353,614 B1 | 3/2002 | Borella et al. |
| 6,505,192 B1 | 1/2003 | Godwin et al. |
| 6,512,745 B1 | 1/2003 | Abe et al. |
| 6,539,432 B1 | 3/2003 | Taguchi et al. |
| 6,678,274 B1 | 1/2004 | Walia et al. |
| 6,680,934 B1 | 1/2004 | Cain |
| 6,781,990 B1 | 8/2004 | Puri et al. |
| 6,785,843 B1 | 8/2004 | McRae et al. |
| 6,862,264 B1 | 3/2005 | Moura et al. |
| 6,880,089 B1 | 4/2005 | Bommareddy et al. |
| 6,907,042 B1 | 6/2005 | Oguchi |
| 6,963,585 B1 | 11/2005 | Le Pennec et al. |
| 7,042,912 B2 | 5/2006 | Smith et al. |
| 7,046,630 B2 | 5/2006 | Abe et al. |
| 7,055,027 B1 | 5/2006 | Gunter et al. |
| 7,055,173 B1 | 5/2006 | Chaganty et al. |
| 7,126,923 B1 | 10/2006 | Yang et al. |
| 7,197,572 B2 | 3/2007 | Matters et al. |
| 7,206,861 B1 | 4/2007 | Callon |
| 7,209,439 B2 | 4/2007 | Rawlins et al. |
| 7,283,465 B2 | 10/2007 | Zelig et al. |
| 7,283,473 B2 | 10/2007 | Arndt et al. |
| 7,286,490 B2 | 10/2007 | Saleh et al. |
| 7,342,916 B2 | 3/2008 | Das et al. |
| 7,343,410 B2 | 3/2008 | Mercier et al. |
| 7,447,775 B1 | 11/2008 | Zhu et al. |
| 7,450,598 B2 | 11/2008 | Chen et al. |
| 7,467,198 B2 | 12/2008 | Goodman et al. |
| 7,478,173 B1 | 1/2009 | Delco |
| 7,512,744 B2 | 3/2009 | Banga et al. |
| 7,554,995 B2 | 6/2009 | Short et al. |
| 7,555,002 B2 | 6/2009 | Arndt et al. |
| 7,606,229 B1 | 10/2009 | Foschiano et al. |
| 7,606,260 B2 | 10/2009 | Oguchi et al. |
| 7,627,692 B2 | 12/2009 | Pessi |
| 7,647,426 B2 | 1/2010 | Patel et al. |
| 7,649,851 B2 | 1/2010 | Takashige et al. |
| 7,706,266 B2 | 4/2010 | Plamondon |
| 7,706,325 B2 | 4/2010 | Fodor et al. |
| 7,710,872 B2 | 5/2010 | Vasseur |
| 7,710,874 B2 | 5/2010 | Balakrishnan et al. |
| 7,725,602 B2 | 5/2010 | Liu et al. |
| 7,730,486 B2 | 6/2010 | Herington |
| 7,742,398 B1 | 6/2010 | Tene et al. |
| 7,761,259 B1 | 7/2010 | Seymour |
| 7,764,599 B2 | 7/2010 | Doi et al. |
| 7,792,987 B1 | 9/2010 | Vohra et al. |
| 7,802,000 B1 | 9/2010 | Huang et al. |
| 7,808,929 B2 | 10/2010 | Wong et al. |
| 7,818,452 B2 | 10/2010 | Matthews et al. |
| 7,826,390 B2 | 11/2010 | Noel et al. |
| 7,826,482 B1 | 11/2010 | Minei et al. |
| 7,839,847 B2 | 11/2010 | Nadeau et al. |
| 7,855,950 B2 | 12/2010 | Zwiebel et al. |
| 7,856,549 B2 | 12/2010 | Wheeler |
| 7,885,276 B1 | 2/2011 | Lin |
| 7,925,661 B2 | 4/2011 | Broussard et al. |
| 7,925,850 B1 | 4/2011 | Waldspurger et al. |
| 7,933,198 B1 | 4/2011 | Pan |
| 7,936,770 B1 | 5/2011 | Frattura et al. |
| 7,937,438 B1 | 5/2011 | Miller et al. |
| 7,945,658 B1 | 5/2011 | Nucci et al. |
| 7,948,986 B1 | 5/2011 | Ghosh et al. |
| 7,953,865 B1 | 5/2011 | Miller et al. |
| 7,991,859 B1 | 8/2011 | Miller et al. |
| 7,995,483 B1 | 8/2011 | Bayar et al. |
| 8,005,015 B2 | 8/2011 | Belqasmi et al. |
| 8,018,866 B1 | 9/2011 | Kasturi et al. |
| 8,027,260 B2 | 9/2011 | Venugopal et al. |
| 8,027,354 B1 | 9/2011 | Portolani et al. |
| 8,031,606 B2 | 10/2011 | Memon et al. |
| 8,031,633 B2 | 10/2011 | Bueno et al. |
| 8,046,456 B1 | 10/2011 | Miller et al. |
| 8,051,180 B2 | 11/2011 | Mazzaferri et al. |
| 8,054,832 B1 | 11/2011 | Shukla et al. |
| 8,055,789 B2 | 11/2011 | Richardson et al. |
| 8,060,779 B2 | 11/2011 | Beardsley et al. |
| 8,060,875 B1 | 11/2011 | Lambeth |
| 8,064,362 B2 | 11/2011 | Mekkattuparamban et al. |
| 8,131,852 B1 | 3/2012 | Miller et al. |
| 8,149,737 B2 | 4/2012 | Metke et al. |
| 8,155,028 B2 | 4/2012 | Abu-Hamdeh et al. |
| 8,166,201 B2 | 4/2012 | Richardson et al. |
| 8,190,767 B1 | 5/2012 | Maufer et al. |
| 8,194,674 B1 | 6/2012 | Pagel et al. |
| 8,196,144 B2 | 6/2012 | Kagan et al. |
| 8,199,750 B1 | 6/2012 | Schultz et al. |
| 8,204,982 B2 | 6/2012 | Casado et al. |
| 8,224,931 B1 | 7/2012 | Brandwine et al. |
| 8,224,971 B1 | 7/2012 | Miller et al. |
| 8,265,071 B2 | 9/2012 | Sindhu et al. |
| 8,265,075 B2 | 9/2012 | Pandey |
| 8,312,129 B1 | 11/2012 | Miller et al. |
| 8,321,936 B1 | 11/2012 | Green et al. |
| 8,339,959 B1 | 12/2012 | Moisand et al. |
| 8,339,994 B2 | 12/2012 | Gnanasekaran et al. |
| 8,456,984 B2 | 6/2013 | Ranganathan et al. |
| 8,463,904 B2 | 6/2013 | Casado et al. |
| 8,468,548 B2 | 6/2013 | Kulkarni et al. |
| 8,473,557 B2 | 6/2013 | Ramakrishnan et al. |
| 8,516,158 B1 | 8/2013 | Wu et al. |
| 8,543,808 B2 | 9/2013 | Ahmed et al. |
| 8,571,031 B2 | 10/2013 | Davies et al. |
| 8,611,351 B2 | 12/2013 | Gooch et al. |
| 8,612,627 B1 | 12/2013 | Brandwine et al. |
| 8,615,579 B1 | 12/2013 | Vincent et al. |
| 8,621,058 B2 | 12/2013 | Eswaran et al. |
| 8,625,594 B2 | 1/2014 | Safrai et al. |
| 8,644,188 B1 | 2/2014 | Brandwine et al. |
| 8,650,299 B1 | 2/2014 | Huang et al. |
| 8,650,618 B2 | 2/2014 | Asati et al. |
| 8,705,527 B1 | 4/2014 | Addepalli et al. |
| 8,743,885 B2 | 6/2014 | Khan et al. |

(56) References Cited

U.S. PATENT DOCUMENTS

| | | |
|---|---|---|
| 8,762,501 B2 | 6/2014 | Kempf et al. |
| 8,813,209 B2 | 8/2014 | Bhattacharya et al. |
| 8,819,678 B2 | 8/2014 | Tsirkin |
| 8,874,757 B2 | 10/2014 | Souza |
| 8,913,611 B2 | 12/2014 | Koponen et al. |
| 8,913,661 B2 | 12/2014 | Bivolarsky et al. |
| 8,966,024 B2 | 2/2015 | Koponen et al. |
| 8,966,029 B2 | 2/2015 | Zhang et al. |
| 8,966,035 B2 | 2/2015 | Casado et al. |
| 9,015,823 B2 | 4/2015 | Koponen et al. |
| 9,104,458 B1 | 8/2015 | Brandwine et al. |
| 9,172,603 B2 | 10/2015 | Padmanabhan et al. |
| 9,195,491 B2 | 11/2015 | Zhang et al. |
| 9,306,909 B2 | 4/2016 | Koponen et al. |
| 9,329,886 B2 | 5/2016 | Vincent |
| 9,448,821 B2 | 9/2016 | Wang |
| 9,552,219 B2 | 1/2017 | Zhang et al. |
| 9,558,027 B2 | 1/2017 | Zhang et al. |
| 9,697,030 B2 | 6/2017 | Koponen et al. |
| 9,697,033 B2 | 7/2017 | Koponen et al. |
| 10,089,127 B2 | 10/2018 | Padmanabhan et al. |
| 2001/0043614 A1 | 11/2001 | Viswanadham et al. |
| 2002/0034189 A1 | 3/2002 | Haddock et al. |
| 2002/0093952 A1 | 7/2002 | Gonda |
| 2002/0161867 A1 | 10/2002 | Cochran et al. |
| 2002/0194369 A1 | 12/2002 | Rawlins et al. |
| 2003/0009559 A1 | 1/2003 | Ikeda |
| 2003/0058850 A1 | 3/2003 | Rangarajan et al. |
| 2003/0069972 A1 | 4/2003 | Yoshimura et al. |
| 2003/0079000 A1 | 4/2003 | Chamberlain |
| 2003/0093481 A1 | 5/2003 | Mitchell et al. |
| 2003/0131116 A1 | 7/2003 | Jain et al. |
| 2004/0049701 A1 | 3/2004 | Le Pennec et al. |
| 2004/0054793 A1 | 3/2004 | Coleman |
| 2004/0073659 A1 | 4/2004 | Rajsic et al. |
| 2004/0098505 A1 | 5/2004 | Clemmensen |
| 2004/0131059 A1 | 7/2004 | Ayyakad et al. |
| 2005/0013280 A1 | 1/2005 | Buddhikot et al. |
| 2005/0018669 A1 | 1/2005 | Arndt et al. |
| 2005/0021683 A1 | 1/2005 | Newton et al. |
| 2005/0027881 A1 | 2/2005 | Figueira et al. |
| 2005/0050377 A1 | 3/2005 | Chan et al. |
| 2005/0060365 A1 | 3/2005 | Robinson et al. |
| 2005/0083953 A1 | 4/2005 | May |
| 2005/0132030 A1 | 6/2005 | Hopen et al. |
| 2005/0249199 A1 | 11/2005 | Albert et al. |
| 2006/0026225 A1 | 2/2006 | Canali et al. |
| 2006/0092976 A1 | 5/2006 | Lakshman et al. |
| 2006/0215684 A1 | 9/2006 | Capone et al. |
| 2006/0221961 A1 | 10/2006 | Basso et al. |
| 2007/0101323 A1 | 5/2007 | Foley et al. |
| 2007/0101421 A1 | 5/2007 | Wesinger, Jr. et al. |
| 2007/0140128 A1 | 6/2007 | Klinker et al. |
| 2007/0233838 A1 | 10/2007 | Takamoto et al. |
| 2007/0239987 A1 | 10/2007 | Hoole et al. |
| 2007/0266433 A1 | 11/2007 | Moore |
| 2007/0283348 A1 | 12/2007 | White |
| 2007/0286185 A1 | 12/2007 | Eriksson et al. |
| 2008/0002579 A1 | 1/2008 | Lindholm et al. |
| 2008/0005293 A1 | 1/2008 | Bhargava et al. |
| 2008/0049621 A1 | 2/2008 | McGuire et al. |
| 2008/0071900 A1 | 3/2008 | Hecker et al. |
| 2008/0072305 A1 | 3/2008 | Casado et al. |
| 2008/0151893 A1 | 6/2008 | Nordmark et al. |
| 2008/0163207 A1 | 7/2008 | Reumann et al. |
| 2008/0186990 A1 | 8/2008 | Abali et al. |
| 2008/0189769 A1 | 8/2008 | Casado et al. |
| 2008/0196100 A1 | 8/2008 | Madhavan et al. |
| 2008/0205377 A1 | 8/2008 | Chao et al. |
| 2008/0225853 A1 | 9/2008 | Melman et al. |
| 2008/0232250 A1 | 9/2008 | Park |
| 2008/0240122 A1 | 10/2008 | Richardson et al. |
| 2008/0281908 A1 | 11/2008 | McCanne et al. |
| 2009/0025077 A1 | 1/2009 | Trojanowski |
| 2009/0031041 A1 | 1/2009 | Clemmensen |
| 2009/0063750 A1 | 3/2009 | Dow |
| 2009/0083445 A1 | 3/2009 | Ganga |
| 2009/0092137 A1 | 4/2009 | Haigh et al. |
| 2009/0122710 A1 | 5/2009 | Bar-Tor et al. |
| 2009/0129271 A1 | 5/2009 | Ramankutty et al. |
| 2009/0150527 A1 | 6/2009 | Tripathi et al. |
| 2009/0161547 A1 | 6/2009 | Riddle et al. |
| 2009/0199177 A1 | 8/2009 | Edwards et al. |
| 2009/0240924 A1 | 9/2009 | Yasaki et al. |
| 2009/0249470 A1 | 10/2009 | Litvin et al. |
| 2009/0249472 A1 | 10/2009 | Litvin et al. |
| 2009/0249473 A1 | 10/2009 | Cohn |
| 2009/0279536 A1 | 11/2009 | Unbehagen et al. |
| 2009/0292858 A1 | 11/2009 | Lambeth et al. |
| 2009/0300210 A1 | 12/2009 | Ferris |
| 2009/0303880 A1 | 12/2009 | Maltz et al. |
| 2009/0327464 A1 | 12/2009 | Archer et al. |
| 2009/0327781 A1 | 12/2009 | Tripathi |
| 2010/0046530 A1 | 2/2010 | Hautakorpi et al. |
| 2010/0046531 A1 | 2/2010 | Louati et al. |
| 2010/0128623 A1 | 3/2010 | Dunn et al. |
| 2010/0098092 A1 | 4/2010 | Luo et al. |
| 2010/0115080 A1 | 5/2010 | Kageyama |
| 2010/0115101 A1 | 5/2010 | Lain et al. |
| 2010/0125667 A1 | 5/2010 | Soundararajan |
| 2010/0131636 A1 | 5/2010 | Suri et al. |
| 2010/0131638 A1 | 5/2010 | Kondamuru |
| 2010/0138830 A1 | 6/2010 | Astete et al. |
| 2010/0153554 A1 | 6/2010 | Anschutz et al. |
| 2010/0162036 A1 | 6/2010 | Linden et al. |
| 2010/0165876 A1 | 7/2010 | Shukla et al. |
| 2010/0165877 A1 | 7/2010 | Shukla et al. |
| 2010/0169467 A1 | 7/2010 | Shukla et al. |
| 2010/0214949 A1 | 8/2010 | Smith et al. |
| 2010/0254385 A1 | 10/2010 | Sharma et al. |
| 2010/0257263 A1 | 10/2010 | Casado et al. |
| 2010/0275199 A1 | 10/2010 | Smith et al. |
| 2010/0284402 A1 | 11/2010 | Narayanan |
| 2010/0287548 A1 | 11/2010 | Zhou et al. |
| 2010/0306408 A1 | 12/2010 | Greenberg et al. |
| 2010/0318665 A1 | 12/2010 | Demmer et al. |
| 2010/0322255 A1 | 12/2010 | Hao et al. |
| 2011/0002346 A1 | 1/2011 | Wu |
| 2011/0004698 A1 | 1/2011 | Wu |
| 2011/0004876 A1 | 1/2011 | Wu et al. |
| 2011/0004877 A1 | 1/2011 | Wu |
| 2011/0022695 A1 | 1/2011 | Dalal et al. |
| 2011/0026521 A1 | 2/2011 | Gamage et al. |
| 2011/0075674 A1 | 3/2011 | Li et al. |
| 2011/0085557 A1 | 4/2011 | Gnanasekaran et al. |
| 2011/0085559 A1 | 4/2011 | Chung et al. |
| 2011/0085563 A1 | 4/2011 | Kotha et al. |
| 2011/0119748 A1 | 5/2011 | Edwards et al. |
| 2011/0173692 A1 | 7/2011 | Liu et al. |
| 2011/0197039 A1 | 8/2011 | Green et al. |
| 2011/0225594 A1 | 9/2011 | Iyengar et al. |
| 2011/0255538 A1 | 10/2011 | Srinivasan et al. |
| 2011/0261825 A1 | 10/2011 | Ichino |
| 2011/0289230 A1 | 11/2011 | Ueno |
| 2011/0299534 A1 | 12/2011 | Koganti et al. |
| 2011/0299538 A1 | 12/2011 | Maruta |
| 2011/0310899 A1 | 12/2011 | Alkhatib et al. |
| 2012/0011264 A1 | 1/2012 | Izawa |
| 2012/0014386 A1 | 1/2012 | Xiong et al. |
| 2012/0144014 A1 | 6/2012 | Natham et al. |
| 2012/0155266 A1 | 6/2012 | Patel et al. |
| 2012/0185577 A1 | 7/2012 | Giaretta et al. |
| 2012/0236734 A1 | 9/2012 | Sampath et al. |
| 2012/0240182 A1 | 9/2012 | Narayanaswamy et al. |
| 2012/0246637 A1 | 9/2012 | Kreeger et al. |
| 2012/0281540 A1 | 11/2012 | Khan et al. |
| 2013/0003735 A1 | 1/2013 | Chao et al. |
| 2013/0019015 A1 | 1/2013 | Devarakonda et al. |
| 2013/0036416 A1 | 2/2013 | Raju et al. |
| 2013/0041987 A1 | 2/2013 | Warno |
| 2013/0054761 A1 | 2/2013 | Kempf et al. |
| 2013/0058250 A1 | 3/2013 | Casado et al. |
| 2013/0058350 A1 | 3/2013 | Fulton |

(56) References Cited

U.S. PATENT DOCUMENTS

| | | | |
|---|---|---|---|
| 2013/0061047 A1* | 3/2013 | Sridharan | H04L 45/586 713/162 |
| 2013/0073743 A1 | 3/2013 | Ramasamy et al. | |
| 2013/0074181 A1 | 3/2013 | Singh | |
| 2013/0103834 A1 | 4/2013 | Dzerve et al. | |
| 2013/0132532 A1 | 5/2013 | Zhang et al. | |
| 2013/0132533 A1 | 5/2013 | Padmanabhan et al. | |
| 2013/0163427 A1 | 6/2013 | Beliveau et al. | |
| 2013/0163475 A1 | 6/2013 | Beliveau et al. | |
| 2013/0163594 A1 | 6/2013 | Sharma et al. | |
| 2013/0227097 A1 | 8/2013 | Yasuda et al. | |
| 2013/0332619 A1 | 12/2013 | Xie et al. | |
| 2013/0332983 A1 | 12/2013 | Koorevaar et al. | |
| 2014/0016501 A1 | 1/2014 | Kamath et al. | |
| 2014/0019639 A1 | 1/2014 | Ueno | |
| 2014/0068602 A1 | 3/2014 | Gember et al. | |
| 2014/0153577 A1 | 6/2014 | Janakiraman et al. | |
| 2014/0169375 A1 | 6/2014 | Khan et al. | |
| 2014/0195666 A1 | 7/2014 | Dumitriu et al. | |
| 2014/0359620 A1* | 12/2014 | Van Kerkwyk | H04L 41/042 718/1 |
| 2015/0081861 A1 | 3/2015 | Koponen et al. | |
| 2015/0098360 A1 | 4/2015 | Koponen et al. | |
| 2015/0124651 A1 | 5/2015 | Zhang et al. | |
| 2015/0142938 A1 | 5/2015 | Koponen et al. | |
| 2015/0222598 A1 | 8/2015 | Koponen et al. | |
| 2016/0070588 A1 | 3/2016 | Zhang et al. | |
| 2017/0116023 A1 | 4/2017 | Zhang et al. | |
| 2017/0277557 A1 | 9/2017 | Koponen et al. | |

FOREIGN PATENT DOCUMENTS

| | | |
|---|---|---|
| AU | 2015255293 | 12/2015 |
| AU | 2015258160 | 12/2015 |
| AU | 2017204765 A1 | 7/2017 |
| CN | 1886962 | 12/2006 |
| CN | 101904155 A | 12/2010 |
| EP | 1653688 | 5/2006 |
| EP | 2395712 A1 | 12/2011 |
| EP | 2748713 | 7/2014 |
| EP | 2748714 | 7/2014 |
| EP | 2748716 | 7/2014 |
| EP | 2748717 | 7/2014 |
| EP | 2748750 | 7/2014 |
| EP | 2748978 | 7/2014 |
| EP | 3373560 A1 | 9/2018 |
| JP | 2000332817 A | 11/2000 |
| JP | 2003-124976 | 4/2003 |
| JP | 2003-318949 | 11/2003 |
| JP | 2005260299 A | 9/2005 |
| JP | 2011188433 A | 9/2011 |
| JP | 2011211502 A | 10/2011 |
| JP | 2012525017 A | 10/2012 |
| WO | WO 99/18534 | 4/1999 |
| WO | WO 2005/112390 | 11/2005 |
| WO | WO 2008/095010 | 8/2008 |
| WO | 2010090182 A1 | 8/2010 |
| WO | 2010116606 A1 | 10/2010 |
| WO | 2012051884 A1 | 4/2012 |
| WO | WO 2013/074827 | 5/2013 |
| WO | WO 2013/074828 | 5/2013 |
| WO | WO 2013/074831 | 5/2013 |
| WO | WO 2013/074842 | 5/2013 |
| WO | WO 2013/074844 | 5/2013 |
| WO | WO 2013/074847 | 5/2013 |
| WO | WO 2013/074855 | 5/2013 |

OTHER PUBLICATIONS

Casado, Martin, et al. "Ethane: Taking Control of the Enterprise," SIGCOMM'07, Aug. 27-31, 2007, 12 pages, ACM, Kyoto, Japan.
Casado, Martin, et al., "Scaling Out: Network Virtualization Revisited," Month Unknown 2010, 8 pages.
Casado, Martin, et al., "Virtualizing the Network Forwarding Plane," Dec. 2010, 6 pages.
Dixon, Colin, et al., "An End to the Middle," Proceedings of the 12th Conference on Hot Topics in Operating Systems, May 2009, 5 pages, USENIX Association, Berkeley, CA, USA.
Dumitriu, Dan Mihai, et al. (U.S. Appl. No. 61/514,990), filed Aug. 4, 2011.
Foster, Nate, et al., "Frenetic: A Network Programming Language," ICFP '11, Sep. 19-21, 2011, 13 pages, Tokyo, Japan.
Gude, Natasha, et al., "NOX: Towards an Operating System for Networks," ACM SIGCOMM Computer Communication Review, Jul. 2008, 6 pages, vol. 38, No. 3.
Hinrichs, Timothy L., et al., "Practical Declarative Network Management," WREN'09, Aug. 21, 2009, 10 pages, Barcelona, Spain.
Joseph, Dilip Antony, et al., "A Policy-aware Switching Layer for Data Centers," Jun. 24, 2008, 26 pages, Electrical Engineering and Computer Sciences, University of California, Berkeley, CA, USA.
Keller, Eric, et al., "The 'Platform as a Service' Model for Networking," Month Unknown 2010, 6 pages.
Koponen, Teemu, et al., "Onix: A Distributed Control Platform for Large-scale Production Networks," In Proc. OSDI, Oct. 2010, 14 pages.
Luo, Jianying, et al., "Prototyping Fast, Simple, Secure Switches for Ethane," Month Unknown 2007, 6 pages.
McKeown, Nick, et al., "OpenFlow: Enabling Innovation in Campus Networks," ACS SIGCOMM Computer communication Review, Apr. 2008, 6 pages, vol. 38, No. 2.
Popa, Lucian, et al., "Building Extensible Networks with Rule-Based Forwarding," In USENIX OSDI, Month Unknow 2010, 14 pages.
Sekar, Vyas, et al., "Design and Implementation of a Consolidated Middlebox Architecture," In Proc. of NSDI, Month Unknown 2012, 14 pages.
Sherry, Justine, et al., "Making Middleboxes Someone Else's Problem: Network Processing as a Cloud Service," In Proc. of SIGCOMM '12, Aug. 13-17, 2012, 12 pages, Helsinki, Finland.
Pfaff, Ben., et al., "Extending Networking into the Virtualization Layer," Proc. of HotNets, Oct. 2009, 6 pages.
Ioannidis, Sotiris, et al., "Implementing a Distributed Firewall," CCS'00, Month Unknown 2000, 10 pages, ACM, Athens, Greece.
Kent, Stephen, "IP Encapsulating Security Payload (ESP)," RFC 4303, Dec. 2005, 44 pages, The Internet Society.
Mahalingham, Mallik, et al., "VXLAN: A Framework for Overlaying Virtualized Layer 2 Networks over Layer 3 Networks," Internet Draft, Aug. 26, 2011, 20 pages, Internet Engineering Task Force.
Pettit, Justin, et al., "Virtual Switching in an Era of Advanced Edges," In Proc. 2nd Workshop on Data Center-Converged and Virtual Ethernet Switching (DCCAVES), Sep. 2010, 7 pages, vol. 22. ITC.
Stiemerling, M., et al., "Middlebox Communication (MIDCOM) Protocol Semandtics," Mar. 2008, 70 pages, Internet Engineering Task Force.
U.S. Appl. No. 15/398,689, filed Jan. 4, 2017, Zhang, Ronghua, et al.
International Search Report and Written Opinion of PCT/US2012/065359, dated Jan. 29, 2013, Nicira, Inc.
Portions of prosecution history of EP12849710.4, Jul. 10, 2015 (mailing date), Nicira, Inc.
International Serach Report and Written Opinion of PCT/US2012/065341, dated Jan. 28, 2013, Nicira, Inc.
Portions of prosecution history of EP12849295.6, Sep. 23, 2015 (mailing date), Nicira, Inc.
International Search Report and Written Opinion of PCT/US2012/065361, dated Jan. 29, 2013, Nicira, Inc.
Portions of prosecution history of EP12849104.0, Jul. 24, 2015 (mailing date), Nicira, Inc.
International Search Report and Written Opinion of PCT/US2012/065339, dated Feb. 5, 2013, Nicira, Inc.
Portions of prosecution history of AU2012340383, Dec. 3, 2015 (mailing date), Nicira, Inc.
Portions of prosecution history of AU2015255293, Nov. 13, 2015 (mailing date), Nicira, Inc.

(56) References Cited

OTHER PUBLICATIONS

Portions of prosecution history of EP12850519.5, Jul. 7, 2015 (mailing date), Nicira, Inc.
International Search Report and Written Opinion of PCT/US2012/065383, dated Jan. 29, 2013, Nicira, Inc.
International Search Report and Written Opinion of PCT/US2012/065345, dated Feb. 1, 2013, Nicira, Inc.
Portions of prosecution history of AU2012340387, Dec. 3, 2015 (mailing date), Nicira, Inc.
Portions of prosecution history of AU2015258160, Oct. 14, 2016 (mailing date), Nicira, Inc.
Portions of prosecution history of EP12849015.8, Jul. 23, 2015 (mailing date), Nicira, Inc.
International Search Report and Written Opinion of PCT/US2012/065364, dated Jan. 29, 2013, Nicira, Inc.
Portions of prosecution history of EP12850665.6, Nov. 11, 2015 (mailing date), Nicira, Inc.

* cited by examiner

NETWORK CONTROL SYSTEM FOR CONFIGURING MIDDLEBOXES

CLAIM OF BENEFIT TO PRIOR APPLICATIONS

This application is a continuation application of U.S. patent application Ser. No. 14/595,195, filed Jan. 12, 2015, now published as U.S. Patent Publication 2015/0124651. U.S. patent application Ser. No. 14/595,195 is a continuation application of U.S. patent application Ser. No. 13/678,485, filed Nov. 15, 2012, now issued as U.S. Pat. No. 8,966,029. U.S. patent application Ser. No. 13/678,485 claims the benefit of U.S. Provisional Application 61/560,279, entitled "Virtual Middlebox Services", filed Nov. 15, 2011. U.S. patent application Ser. No. 14/595,195, now published as U.S. Patent Publication 2015/0124651, U.S. patent application Ser. No. 13/678,485, now issued as U.S. Pat. No. 8,966,029, and U.S. Provisional Application 61/560,279 are incorporated herein by reference.

BACKGROUND

Many current enterprises have large and sophisticated networks comprising switches, hubs, routers, middleboxes (e.g., firewalls), servers, workstations and other networked devices, which support a variety of connections, applications and systems. The increased sophistication of computer networking, including virtual machine migration, dynamic workloads, multi-tenancy, and customer specific quality of service and security configurations require a better paradigm for network control. Networks have traditionally been managed through low-level configuration of individual network components. Network configurations often depend on the underlying network: for example, blocking a user's access with an access control list ("ACL") entry requires knowing the user's current IP address. More complicated tasks require more extensive network knowledge: forcing guest users' port 80 traffic to traverse an HTTP proxy requires knowing the current network topology and the location of each guest. This process is of increased difficulty where the network switching elements are shared across multiple users.

In response, there is a growing movement towards a new network control paradigm called Software-Defined Networking (SDN). In the SDN paradigm, a network controller, running on one or more servers in a network, controls, maintains, and implements control logic that governs the forwarding behavior of shared network switching elements on a per user basis. Making network management decisions often requires knowledge of the network state. To facilitate management decision-making, the network controller creates and maintains a view of the network state and provides an application programming interface upon which management applications may access a view of the network state.

Some of the primary goals of maintaining large networks (including both datacenters and enterprise networks) are scalability, mobility, and multi-tenancy. Many approaches taken to address one of these goals results in hampering at least one of the others. For instance, one can easily provide network mobility for virtual machines within an L2 domain, but L2 domains cannot scale to large sizes. Furthermore, retaining user isolation greatly complicates mobility. As such, improved solutions that can satisfy the scalability, mobility, and multi-tenancy goals are needed.

BRIEF SUMMARY

Some embodiments provide a network control system that allows a user to specify a logical network that includes one or more middleboxes as well as logical data path sets. The user specifies (1) a network topology including logical forwarding elements (e.g., logical routers, logical switches) and middlebox locations within the network, (2) routing policies for forwarding traffic to the middleboxes, and (3) configurations for the different middleboxes. The network control system of some embodiments uses a set of network controllers to distribute both flow entries that implement the network topology and the middlebox configurations to host machines on which managed switching elements and distributed middleboxes operate, as well as to centralized middlebox appliances operating outside of the host machines.

The network controllers, in some embodiments, are arranged in a hierarchical manner. A user enters the topology and configuration information into a logical controller, or an input translation controller that passes the information to a logical controller as a set of records. The logical controller communicatively couples to a set of physical controllers, with each physical controller in charge of distributing the configuration data to one or more host machines. That is, each host machine is assigned to a particular physical controller that acts as the master for that host machine. The logical controller identifies which host machines need to receive the configuration, then passes the appropriate information to the physical controllers that manage the identified host machines. Before exporting the records to the physical controllers, the logical controller translates the flow entry data. In some embodiments, the middlebox configuration data is not translated, however.

The physical controllers receive the information, perform additional translation for at least some of the data, and pass the translated data to the host machines (i.e., to the managed switching elements and middleboxes on the host machines). As with the logical controllers, in some embodiments the physical controllers translate the flow entries destined for the managed switches but do not perform any translation on the middlebox configuration data. The physical controllers of some embodiments do, however, generate additional data for the middleboxes. Specifically, because the distributed middlebox applications elements operating on the host machine (e.g., as daemons, or applications) may perform several separate middlebox processes for different tenant networks, the physical controllers assign a slicing identifier to the particular configuration for the middlebox. This slicing identifier is also communicated to the managed switching element, which adds the identifier to packets destined for the middlebox in some embodiments.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
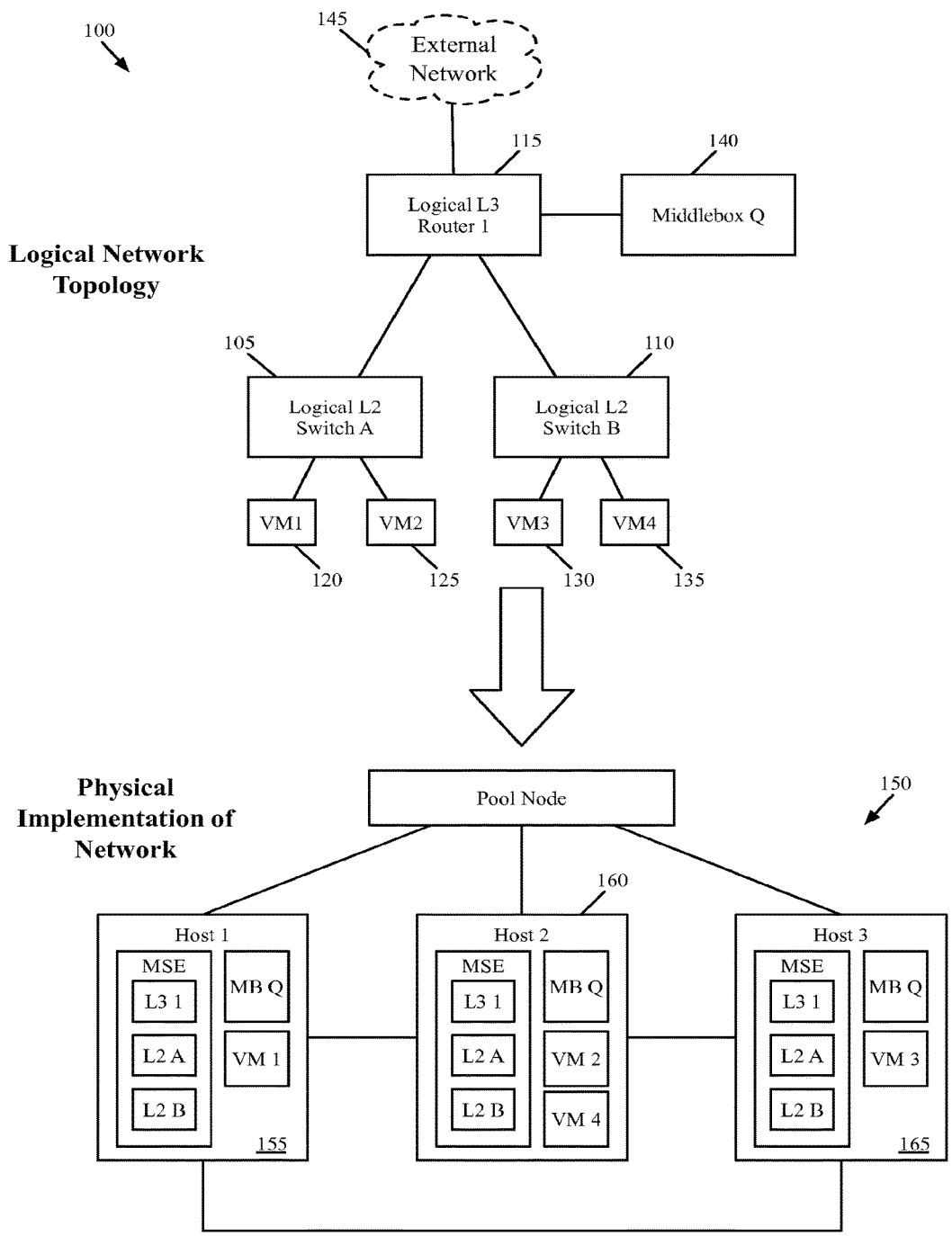
FIG. 1 conceptually illustrates a logical network topology of some embodiments, and the physical network that implements this logical network after configuration by a network control system.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a network control system that allows a user to specify a logical network that includes one or more middleboxes (e.g., firewalls, load balancers, network address translators, intrusion detection systems (IDS), wide area network (WAN) optimizers, etc.) as well as logical data path sets. The user specifies (1) a network topology including logical forwarding elements (e.g., logical routers, logical switches) and middlebox locations within the network, (2) routing policies for forwarding traffic to the middleboxes, and (3) configurations for the different middleboxes. The network control system of some embodiments uses a set of network controllers to distribute both flow entries that implement the network topology and the middlebox configurations to host machines on which managed switching elements and distributed middleboxes operate, as well as to centralized middlebox appliances operating outside of the host machines.

The network controllers, in some embodiments, are arranged in a hierarchical manner. A user enters the topology and configuration information into a logical controller, or an input translation controller that passes the information to a logical controller as a set of records. The logical controller communicatively couples to a set of physical controllers, with each physical controller in charge of distributing the configuration data to one or more host machines. That is, each host machine is assigned to a particular physical controller that acts as the master for that host machine. The logical controller identifies which host machines need to receive the configuration, then passes the appropriate information to the physical controllers that manage the identified host machines. Before exporting the records to the physical controllers, the logical controller translates the flow entry data. In some embodiments, the middlebox configuration data is not translated, however.

The physical controllers receive the information, perform additional translation for at least some of the data, and pass the translated data to the host machines (i.e., to the managed switching elements and middleboxes on the host machines). As with the logical controllers, in some embodiments the physical controllers translate the flow entries destined for the managed switches but do not perform any translation on the middlebox configuration data. The physical controllers of some embodiments do, however, generate additional data for the middleboxes. Specifically, because the distributed middlebox applications elements operating on the host machine (e.g., as daemons, or applications) may perform several separate middlebox processes for different tenant networks, the physical controllers assign a slicing identifier to the particular configuration for the middlebox. This slicing identifier is also communicated to the managed switching element, which adds the identifier to packets destined for the middlebox in some embodiments.

FIG. 1 conceptually illustrates a logical network topology 100 of some embodiments, and the physical network that implements this logical network after configuration by a network control system. The network topology 100 is a simplified network for purposes of explanation. The network includes two logical L2 switches 105 and 110 connected by a logical L3 router 115. The logical switch 105 connects virtual machines 120 and 125, while the logical switch 110 connects virtual machines 130 and 135. The logical router 115 also connects to an external network 145.

In addition, a middlebox 140 attaches to the logical router 115. One of ordinary skill in the art will recognize that the network topology 100 represents just one particular logical network topology into which a middlebox may be incorporated. In various embodiments, the middlebox may be located directly between two other components (e.g.), directly between the external network and logical router (e.g., in order to monitor and process all traffic entering or exiting the logical network), or in other locations in a more complex network.

In the architecture shown in FIG. 1, the middlebox 140 is not located within the direct traffic flow, either from one domain to the other, or between the external world and the domain. Accordingly, packets will not be sent to the middlebox unless routing policies are specified (e.g., by a user such as a network administrator) for the logical router 115 that determine which packets should be sent to the middlebox for processing. Some embodiments enable the use of policy routing rules, which forward packets based on data beyond the destination address (e.g., destination IP or MAC address). For example, a user might specify (e.g., through a network controller application programming interface (APT) that all packets with a source IP address in the logical subnet switched by logical switch 105 and with a logical ingress port that connects to the logical switch 105, or all packets that enter the network from the external network 145 destined for the logical subnet switched by the logical switch 110, should be directed to the middlebox 140 for processing.

The logical network topology entered by a user (e.g., a network administrator) is distributed, through the network control system, to various physical machines in order to implement the logical network. The second stage of FIG. 1 conceptually illustrates such a physical implementation 150 of the logical network 100. Specifically, the physical implementation 150 illustrates several nodes, including a first host machine 155, a second host machine 160, and a third host machine 165. Each of the three nodes hosts at least one virtual machine of the logical network 100, with virtual machine 120 hosted on the first host machine 155, virtual machines 125 and 135 hosted on the second host machine 160, and virtual machine 130 hosted on the third host machine 165.

In addition, each of the host machines includes a managed switching element ("MSE"). The managed switching elements of some embodiments are software forwarding elements that implement logical forwarding elements for one or more logical networks. For instance, the MSEs in the hosts 155-165 include flow entries in forwarding tables that implement the logical forwarding elements of network 100. Specifically, the MSEs on the host machines implement the logical switches 105 and 110, as well as the logical router 115. On the other hand, some embodiments only implement logical switches at a particular node when at least one virtual machine connected to the logical switch is located at the node (i.e., only implementing logical switch 105 and logical router 115 in the MSE at host 155).

The implementation 300 of some embodiments also includes a pool node 340 that connects to the host machines. In some embodiments, the MSEs residing on the host perform first-hop processing. That is, these MSEs are the first forwarding elements a packet reaches after being sent from a virtual machine, and attempt to perform all of the logical switching and routing at this first hop. However, in some cases a particular MSE may not store flow entries containing all of the logical forwarding information for a network, and therefore may not know what to do with a particular packet. In some such embodiments, the MSE sends the packet to a pool node 340 for further processing. These pool nodes are interior managed switching elements which, in some embodiments, store flow entries that encompass a larger portion of the logical network than the edge software switching elements.

Similar to the distribution of the logical switching elements across the hosts on which the virtual machines of network 100 reside, the middlebox 140 is distributed across middlebox elements on these hosts 155-165. In some embodiments, a middlebox module (or set of modules) resides on the host machines (e.g., operating in the hypervisor of the host).

As stated, the network control system of some embodiments is used to configure the distributed forwarding elements (MSEs) and middleboxes. Each of the three hosts 155-165 is assigned to a particular physical controller that receives flow entries for the MSEs and configuration information for the middleboxes, performs any necessary translations on the data, and passes the data to the elements on the hosts.

While FIG. 1 illustrates only one logical network implemented across the hosts 155-165, some embodiments implement numerous logical networks (e.g., for different tenants) across the set of hosts. As such, a middlebox element on a particular host might actually store configurations for several different middleboxes belonging to several different logical networks. For example, a firewall element may be virtualized to implement two (or more) different firewalls. These will effectively operate as two separate middlebox processes, such that the middlebox element is sliced into several "virtual" middleboxes (of the same type).

In addition, when the MSE on the host sends packets to the middlebox, some embodiments append (e.g., prepend) a slice identifier (or tag) on the packet to identify to which of the several virtual middleboxes the packet is being sent. When multiple middleboxes are implemented on the same middlebox element for a single logical network (e.g., two different load balancers), the slice identifier will need to identify the particular middlebox slice rather than just the logical network to which the packet belongs. Different embodiments may use different slice identifiers for the middleboxes.

In some embodiments, these slice identifiers are assigned by the network control system. Because, for distributed middleboxes such as middlebox 140, the middlebox element will generally only receive packets from the MSE on that host, the slice identifiers can be assigned separately for each middlebox element by the physical controller that manages the particular middlebox element (and MSE). In the case of a centralized middlebox (i.e., a separate physical appliance to which all of the MSEs send packets), a single slice identifier will be used for the virtual middlebox operating on that appliance. In some embodiments, a physical controller that manages the appliance assigns this identifier and then distributes this through the network control system to the other physical controllers, in order for the other physical controllers to pass the information to the MSEs.

The above illustrates examples of the implementation of logical middleboxes in a network of some embodiments. Several more detailed embodiments are described below. Section I describes the network control system of some embodiments for configuring a network in order to implement a logical network that includes a firewall. Section II describes the architecture of a network controller of some embodiments. Next, Section III describes packet processing between two virtual machines when the packet passes through a middlebox. Finally, Section IV describes an electronic system with which some embodiments of the invention are implemented.

I. Network Control System

As described above, some embodiments use a network control system in order to provision middleboxes and managed switching elements for a managed network. In some embodiments, the network control system is a hierarchical set of network controllers, with each level in the hierarchy performing different functions in the provisioning of the managed switching elements and middleboxes.

Figure 2:
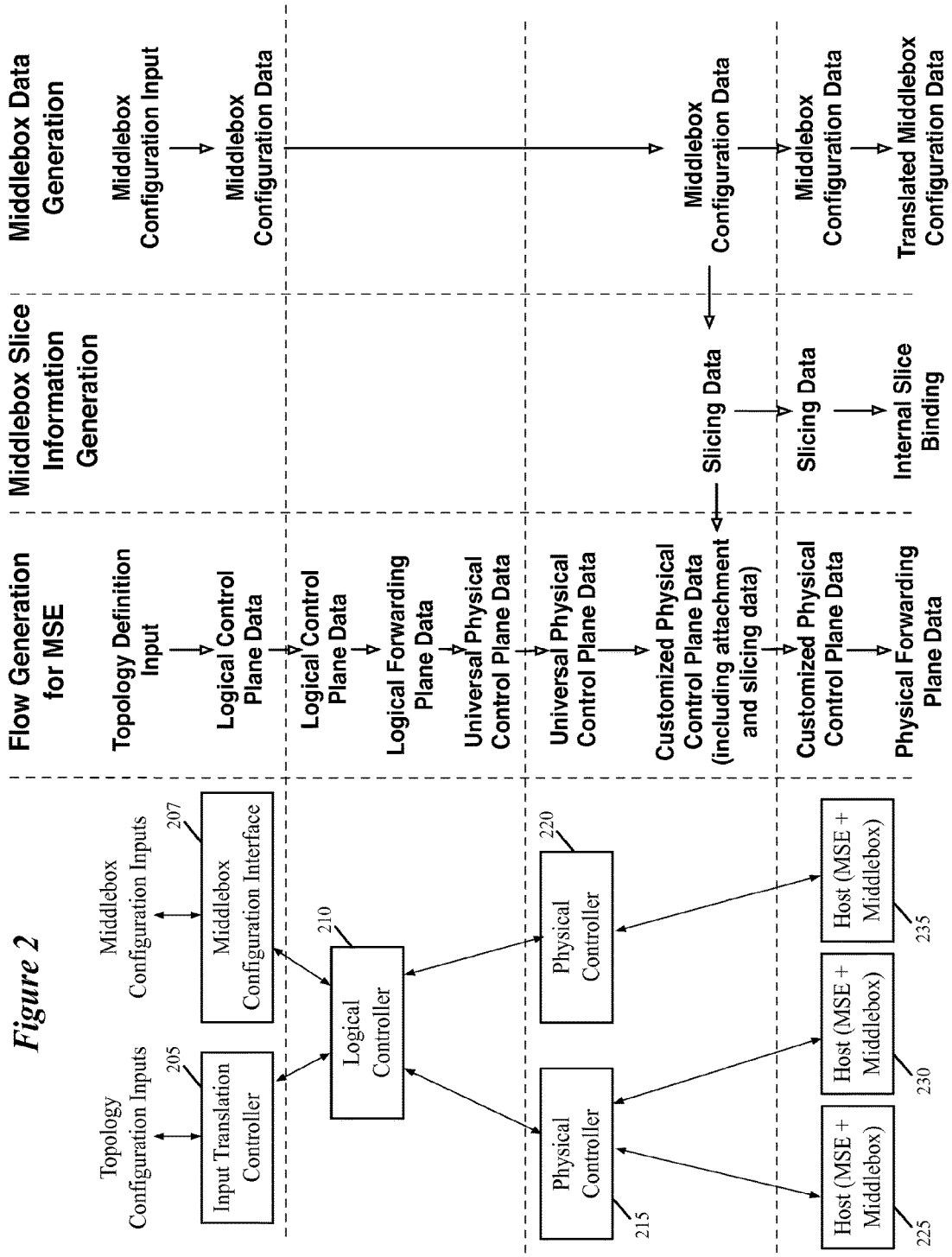
FIG. 2 conceptually illustrates a network control system of some embodiments for configuring managed switching elements and distributed middlebox elements (as well as centralized middleboxes) in order to implement a logical network according to a user specification.

FIG. 2 conceptually illustrates a network control system 200 of some embodiments for configuring managed switching elements and distributed middlebox elements (as well as centralized middleboxes) in order to implement a logical network according to a user specification. As shown, the network control system includes an input translation controller 205, a middlebox configuration interface 207, a logical controller 210, physical controllers 215 and 220, and hosts 225-235. As shown, the hosts 225-235 include both managed switching elements and distributed middlebox elements. In some embodiments, the network control system may include centralized middleboxes (e.g., physical appliances, individual virtual machines) that are each coupled to a single physical controller.

In some embodiments, the middlebox configuration interface 207 is actually a part of the input translation controller 205; in this figure, the two are shown separately as they receive different inputs and include different APIs for communicating with the user. In some embodiments, each of the controllers in the network control system has the capability to function as an input translation controller, logical controller, and/or physical controller. That is, each controller machine includes the necessary application stack for performing the functions of any of the different controller types, but only one of those application stacks is used at any time.

Alternatively, in some embodiments a given controller may only have the functionality to operate as a particular one of the types of controller (e.g., as a physical controller). In addition, different combinations of controllers may run in the same physical machine. For instance, the input translation controller 205, middlebox configuration interface 207 and the logical controller 210 may run in the same computing device, with which a user interacts.

Furthermore, each of the controllers illustrated in FIG. 2 (and subsequent FIGS. 3-5) is shown as a single controller. However, each of these controllers may actually be a controller cluster that operates in a distributed fashion to perform the processing of a logical controller, physical controller, or input translation controller.

The input translation controller 205 of some embodiments includes an input translation application that translates network configuration information received from a user. For example, a user may specify a network topology such as that shown in FIG. 1, which includes a specification as to which machines belong in which logical domain. This effectively specifies a logical data path set, or a set of logical forwarding elements. For each of the logical forwarding elements, the user specifies the machines or other elements that connect to the logical switch (i.e., to which logical ports are assigned for the logical switch). In some embodiments, the user also specifies IP addresses for the machines.

For example, a user might enter a network topology such as that shown in FIG. 1, with machines connected to logical switches, a logical router connecting the two logical switches, and one or more middleboxes connected to ports of the logical router as well. As shown in the flow generation column, the input translation controller 205 translates the entered network topology into logical control plane data that describes the network topology. In some embodiments, the logical control plane data is expressed as a set of database table records (e.g., in the nLog language). An entry in the control plane describing the attachment of a particular virtual machine to the network might state that a particular MAC address B is located at a particular logical port X of a particular logical switch.

The middlebox configuration interface 207 receives middlebox configuration input from a user. In some embodiments, each different middlebox (e.g., middleboxes from different providers, different types of middleboxes) may have a different API particular to the middlebox implementation. That is, the different middlebox implementations have different interfaces presented to the user (i.e., the user will have to enter information in different formats for different particular middleboxes). As shown in the middlebox data generation column of FIG. 2, the user enters a middlebox configuration, which is translated by the middlebox API into middlebox configuration data.

In some embodiments, the middlebox configuration data, as translated by the configuration interface 207, is also a set of records, with each record specifying a particular rule. These records, in some embodiments, are in a similar format to the flow entries propagated to the managed switching elements. In fact, some embodiments use the same applications on the controllers to propagate the firewall configuration records as for the flow entries, and the same table mapping language (e.g., nLog) for the records.

While this figure illustrates the middlebox configuration data being sent to the logical controller, some centralized middleboxes of some embodiments are only accessible through a direct interface with the middlebox device. That is, rather than entering a configuration that is sent to the logical controller and distributed through the network control system, the user enters a configuration directly into the middlebox device. In such a case, the user will still need to enter routing policies to send packets to the middlebox as part of the network topology configuration. In some such embodiments, the network control system will still generate slicing data (i.e., virtualization identifiers) for the middlebox as described below. On the other hand, in some embodiments the user configures the slicing data for the middlebox and either the middlebox or the user provides this information to the network control system.

In some embodiments, each logical network is governed by a particular logical controller (e.g., logical controller 210). With respect to the flow generation for the managed switching elements, the logical controller 210 of some embodiments translates the logical control plane received from the input translation controller 205 data into logical forwarding plane data, and the logical forwarding plane data into universal control plane data. In some embodiments, the logical controller application stack includes a control application for performing the first translation and a virtualization application for performing the second translation. Both of these applications, in some embodiments, use a rules engine for mapping a first set of tables into a second set of tables. That is, the different data planes are represented as tables (e.g., nLog tables), and the controller applications use a table mapping engine to translate between the data planes. In some embodiments, both the control application and virtualization application use the same rules engine to perform their translations.

Logical forwarding plane data, in some embodiments, consists of flow entries described at a logical level. For the MAC address B at logical port X, logical forwarding plane data might include a flow entry specifying that if the destination of a packet matches MAC B, forward the packet to port X.

The translation from logical forwarding plane to physical control plane, in some embodiments, adds a layer to the flow entries that enables a managed switching element provisioned with the flow entries to convert packets received at a physical layer port (e.g., a virtual interface) into the logical domain and perform forwarding in this logical domain. That is, while traffic packets are sent and received within the network at the physical layer, the forwarding decisions are made according to the logical network topology entered by the user. The conversion from the logical forwarding plane to the physical control plane enables this aspect of the network in some embodiments.

As shown, the logical controller converts the logical forwarding plane data to a universal physical control plane, while the physical controllers convert the universal physical control plane data to a customized physical control plane. The universal physical control plane data of some embodiments is a data plane that enables the control system of some embodiments to scale even when it contains a large number of managed switching elements (e.g., thousands) to implement a logical data path set. The universal physical control plane abstracts common characteristics of different managed switching elements in order to express physical control plane data without considering differences in the managed switching elements and/or location specifics of the managed switching elements.

For the example noted above (attachment of MAC B to logical port X), the universal physical control plane would involve several flow entries. The first entry states that if a packet matches the particular logical data path set (e.g., based on the packet being received at a particular logical ingress port), and the destination address matches MAC B, then forward the packet to logical port X. This adds the match over the logical data path set (the conversion from a physical port to a logical port) to the forwarding entry that performs its analysis in the logical domain. This flow entry will be the same in the universal and customized physical control planes, in some embodiments.

Additional flows are generated to match a physical ingress port (e.g., a virtual interface of the host machine) to the logical ingress port X (for packets received from MAC A), as well as to match logical port X to the particular egress port of the physical managed switch (for packets sent to MAC A). However, these physical ingress and egress ports are specific to the host machine containing the managed switching element. As such, the universal physical control plane entries include abstract physical ports (i.e., a generic abstraction of a port not specific to any particular physical host machine) to logical ingress ports as well as for mapping logical egress ports to generic physical egress ports.

The middlebox configuration data, on the other hand, is not converted by the logical controller in some embodiments, while in other embodiments the logical controller performs at least a minimal translation of the middlebox configuration data records. As many middlebox packet processing, modification, and analysis rules operate on the IP address (or TCP connection state) of the packets, and the packets sent to the middlebox will have this information exposed (i.e., not encapsulated within the logical port information), the middlebox configuration does not require translation from logical to physical data planes. Thus, the same middlebox configuration data is passed from the middlebox configuration interface 207 to the logical controller 210, and then to the physical controllers 215 and 220.

In order to distribute the physical control plane data, as well as the middlebox configuration data, the logical controller has to identify which of the host machines (and thus which of the physical controllers) need to receive which flow entries and which middlebox configuration information. In some embodiments, the logical controller 210 stores a description of the logical network and of the physical implementation of that physical network. The logical controller receives the one or more middlebox configuration records for a distributed middlebox, and identifies which of the various nodes will need to receive the configuration information.

In some embodiments, the entire middlebox configuration is distributed to middlebox elements at all of the host machines, so the logical controller identifies all of the machines on which at least one virtual machine resides whose packets require use of the firewall. In general, the identified machines are the hosts for all of the virtual machines in a network (e.g., as for the middlebox shown in FIG. 1). However, some embodiments may identify a subset of the virtual machines in the network if the network topology is such that the middlebox will never be needed at certain host machines. Some embodiments make decisions about which host machines to send the configuration data to on a per-record basis. That is, each particular rule may apply only to a subset of the virtual machines (e.g., only packets originating from a particular virtual machine or subset of virtual machines), and only hosts running these virtual machines need to receive the record.

Similarly, the logical controller identifies which nodes should receive each flow entry in the physical control plane. For instance, the flow entries implementing the logical switch 105 are distributed to the hosts 155 and 160, but not the host 165 in FIG. 1.

Once the logical controller identifies the particular nodes to receive the records, the logical controller identifies the particular physical controllers that manage these particular nodes. In some embodiments, each host machine has an assigned master physical controller. Thus, if the logical controller identifies only first and second hosts as destinations for the configuration data, the physical controllers for these hosts will be identified to receive the data from the logical controller (and other physical controllers will not receive this data). For a centralized middlebox, the logical controller needs only to identify the (single) physical controller that manages the appliance implementing the middlebox. When the centralized middlebox is implemented as a cluster (e.g., as a set of resources, a master-backup cluster, etc.), each of the middlebox appliances in the cluster will receive the configuration data. The middleboxes in the cluster are all managed by a single physical controller in some embodiments, while in other embodiments different physical controllers manage different middleboxes within a cluster.

In order to supply the middlebox configuration data to the hosts, the logical controller of some embodiments pushes the data (using an export module that accesses the output of the table mapping engine in the logical controller) to the physical controllers. In other embodiments, the physical controllers request configuration data (e.g., in response to a signal that the configuration data is available) from the export module of the logical controller.

As stated, each of the physical controllers 215 and 220 is a master of one or more managed switching elements (e.g., located within host machines). In this example, the first physical controller 215 is a master of the managed switching elements at host machines 225 and 230, while the second physical controller 220 is a master of the managed switching element at host machine 235. In some embodiments, a physical controller receives the universal physical control plane data for a logical network and translates this data into customized physical control plane data for the particular managed switches that the physical controller manages that need to receive the data (as the physical controller may also manage additional managed switching elements that do not receive the data for a particular logical network). In other embodiments, the physical controller passes the appropriate universal physical control plane data to the managed switching elements, which includes the ability (e.g., in the form of a chassis controller running on the host machine) to perform the conversion itself.

The universal physical control plane to customized physical control plane translation involves a customization of various data in the flow entries. While the universal physical control plane entries are applicable to any managed switching element because the entries include generic abstractions for any data that is different for different switching elements, the customized physical control plane entries include substituted data specific to the particular managed switching element to which the entry will be sent. For instance, the physical controller customizes the physical layer ports in the universal physical control plane ingress and egress port integration entries to include the actual physical layer ports (e.g., virtual interfaces) of the specific host machines.

As shown in FIG. 2, the physical controllers 215 and 220 pass information to both the managed switching elements and the middleboxes on their assigned host machines. In some embodiments, the middlebox configuration and the physical control plane data are sent to the same database running on the host machine, and the managed switching element and middlebox module retrieve the appropriate information from the database. Similarly, for a centralized middlebox, the physical controller passes the middlebox configuration data to the middlebox appliance (e.g., to a database at the middlebox for storing configuration data).

The customized physical control plane data passed to the managed switching element includes attachment and slicing information to enable the managed switching element to send packets to the middleboxes in some embodiments. This slicing data, as shown by the middlebox slice information generation column of FIG. 2, is generated within the physical controller and also sent to the middlebox in some embodiments along with the physical controller. Because the middlebox configuration is used to virtualize a middlebox instance within the distributed middlebox element, the middlebox element may have multiple separate middlebox processes running at once (e.g., for different tenant networks, for different logical middleboxes within a single tenant network).

Essentially, the slicing information is a tag for the managed switching element to add to packets that it sends to the middlebox. The tag indicates to which of the (potentially) several processes being run by the middlebox the packet should be sent. Thus, when the middlebox receives the packet, the tag enables the middlebox to use the appropriate set of packet processing, analysis, modification, etc. rules in order to perform its operations on the packet. Some embodiments, rather than adding slicing information to the packet, either define different ports of the managed switching element for each middlebox instance, and essentially use the ports to slice the traffic destined for the firewall (in the distributed case), or connect to different ports of the centralized appliance to differentiate between the instances (in the centralized case).

In order to send the slicing data to the managed switching element as part of the customized physical control plane data, in some embodiments the physical controller adds flow entries specifying slicing information particular to the middlebox. Specifically, for a particular managed switching element, the flow entry may specify to add the slicing tag for a particular middlebox (which may be, e.g., a VLAN tag or similar tag) to a packet before sending the packet to the particular middlebox based on a match of the port connecting to the middlebox.

The attachment information, in some embodiments, includes flow entries that enable the managed switching element to send packets to the middlebox. In the distributed middlebox case, with the middlebox in the same physical machine as the managed switching element, the middlebox and the managed switching element negotiate a software port abstraction through which packets will be transferred in some embodiments. In some embodiments, the managed switching element (or the middlebox element) pass this information up to the physical controller, enabling the physical controller to use the information in the customized physical control plane data (i.e., using the specific software port for the customized physical control plane entries).

For centralized middleboxes, some embodiments provide tunneling attachment data to both the managed switching element and the middlebox. The middlebox, in some embodiments, will need to know the type of tunnel encapsulation various host machines will use to send packets to the middlebox. In some embodiments, the middlebox has a list of accepted tunneling protocols (e.g., STT, GRE, etc.), and the chosen protocol is coordinated between the managed switching element(s) and the middlebox. The tunneling protocol may be entered by the user as part of the middlebox configuration, or may be automatically determined by the network control system in different embodiments. The physical controller will also add the tunnel encapsulation information to the customized physical control plane flow entries in order for the managed switching element to encapsulate packets properly for sending to the middlebox.

Upon receiving the customized physical control plane data from the physical controller, a managed switching element performs a translation of the customized physical control plane data into physical forwarding plane data. The physical forwarding plane data, in some embodiments, are the flow entries stored within a forwarding table of a switching element (either a physical router or switch or a software switching element) against which the switching element actually matches received packets and performs actions on the packets based on those matches.

The middlebox receives its configuration data from the physical controller, and in some embodiments translates this configuration data. The middlebox configuration data will be received in a particular language to express the packet processing, analysis, modification, etc. rules, through a control plane API of the middlebox. The middlebox (distributed and/or centralized) of some embodiments compiles these rules into more optimized packet classification rules. In some embodiments, this transformation is similar to the physical control plane to physical forwarding plane data translation. When a packet is received by the middlebox, it applies the compiled optimized rules in order to efficiently and quickly perform its operations on the packet.

As shown in FIG. 2, the middlebox also translates the slicing information into an internal slice binding. In some embodiments, the middlebox uses its own internal identifiers (different from the tags prepended to the packets) in order to identify states (e.g., active TCP connections, statistics about various IP addresses, etc.) within the middlebox. Upon receiving an instruction to create a new middlebox instance and an external identifier (that used on the packets) for the new instance, some embodiments automatically create the new middlebox instance and assign the instance an internal identifier. In addition, the middlebox stores a binding for the instance that maps the external slice identifier to the internal slice identifier.

Figure 3:
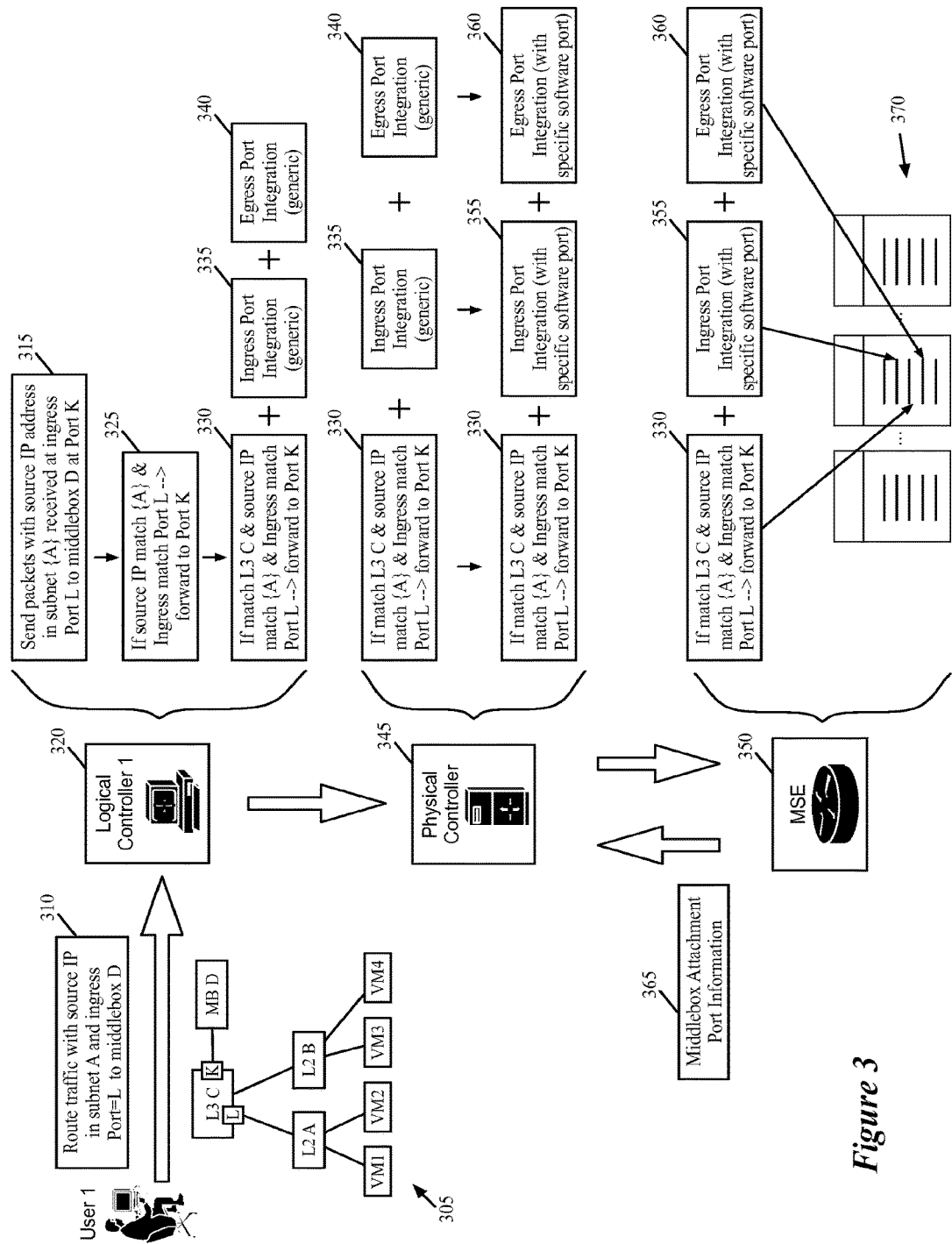
FIGS. 3-5 conceptually illustrate examples of users entering information relating to a middlebox within a logical network into a network control system and the transformations that the data goes through within the network control system.
Figure 4:
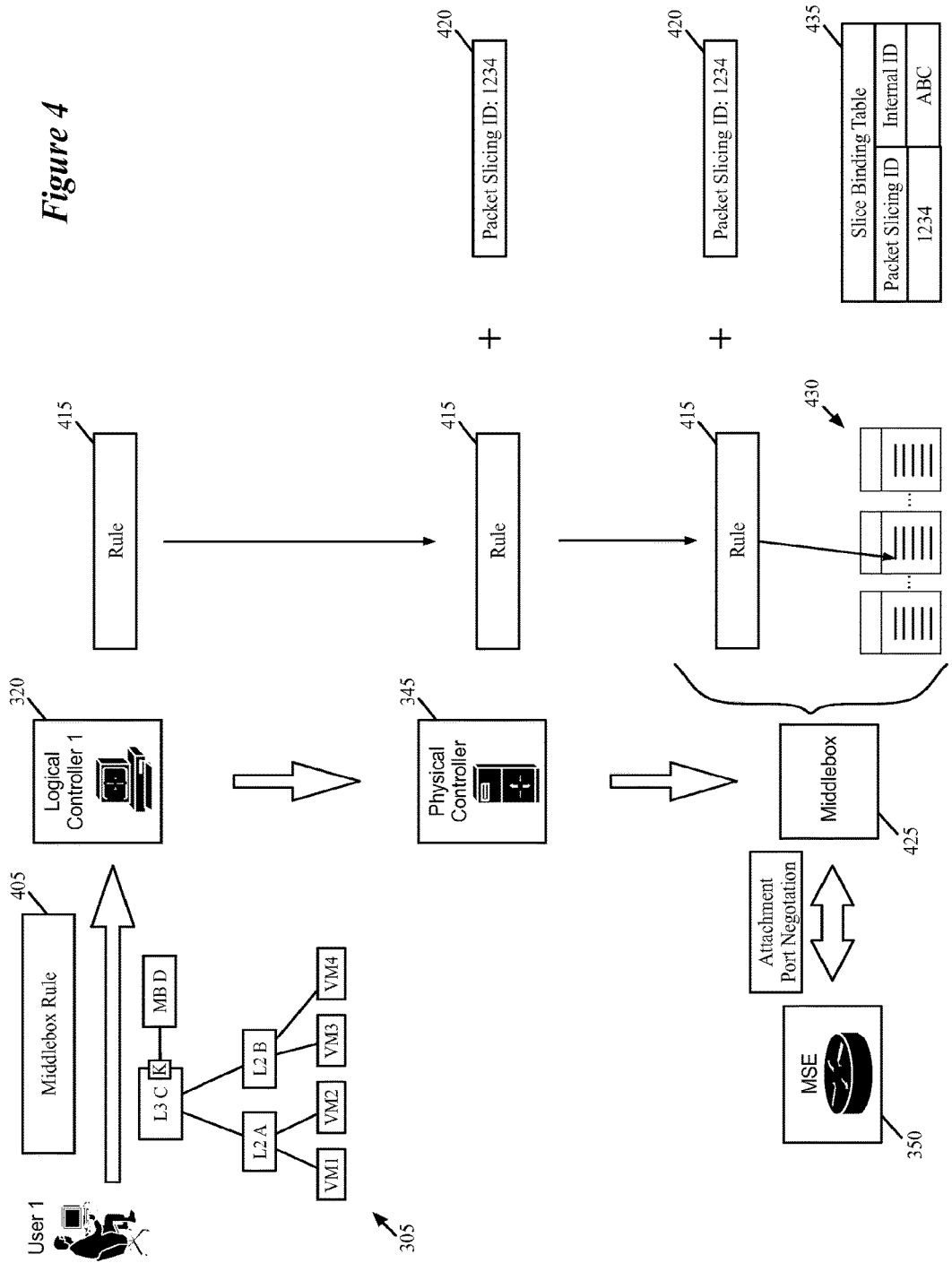
Figure 5:
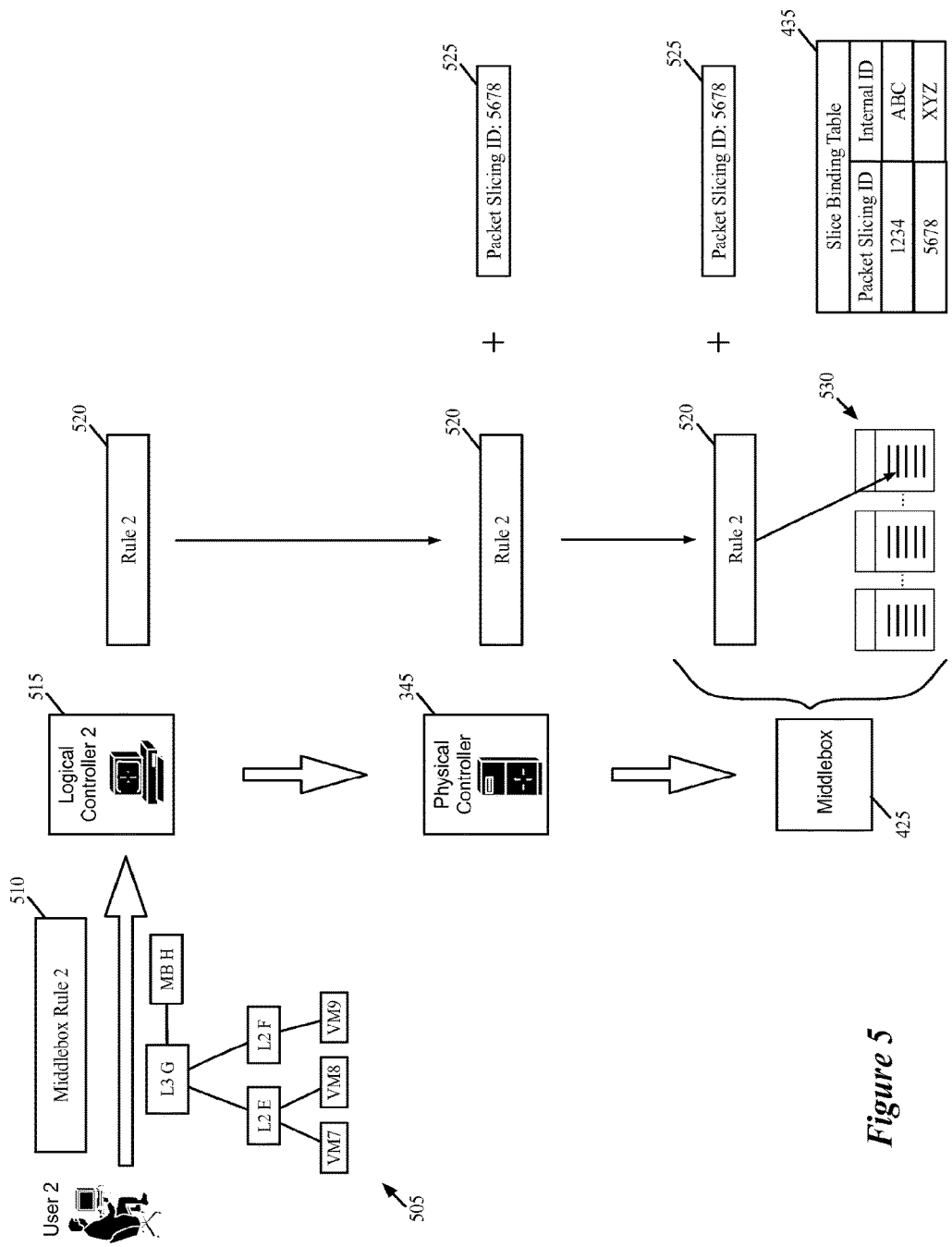

FIGS. 3-5 conceptually illustrate examples of users entering information relating to a middlebox within a logical network into a network control system and the transformations that the data goes through within the network control system. FIG. 3, specifically, illustrates the user entering a logical network topology 305 and a routing policy 310 into the network control system. The logical network topology 305 is similar to that shown in FIG. 1, with two logical switches A and B connected by a logical router C, with a middlebox D hanging off of the router. As shown in the logical topology, the middlebox D attaches to the logical router at Port K.

The routing policy 310 is entered by the user in order to indicate which packets the logical router should send to the middlebox. When the middlebox is located on a logical wire between two logical forwarding elements (e.g., between a logical router and a logical switch), then all packets sent over that logical wire will automatically be forwarded to the middlebox. However, for an out-of-band middlebox such as that in network topology 305, the logical router will only send packets to the middlebox when particular policies are specified by the user.

Whereas routers and switches will normally forward packets according to the destination address (e.g., MAC address or IP address) of the packet, policy routing allows forwarding decisions to be made based on other information stored by the packet (e.g., source addresses, a combination of source and destination addresses, etc.). For example, the user might specify that all packets with source IP addresses in a particular subnet, or that have destination IP addresses not matching a particular set of subnets, should be forwarded to the middlebox. In this specific case, the routing policy 310 specified by the user routes traffic with a source IP in subnet A and an ingress context of logical Port L (i.e., coming from the logical switch A) to the middlebox. While the source IP address would be enough to route packets to the middlebox D, the ingress port prevents packets coming back from the middlebox from being sent to the middlebox again (i.e., a never-ending loop). The packets from the middlebox will have a different ingress port and therefore will not be routed by the policy 310.

As shown, the routing policy is sent, as logical control plane data 315, to the logical controller 320 (e.g., from an input translation controller). In this example, the control plane entry states "Send packets with source IP address in subnet A received at ingress Port L to middlebox D at Port K". This L3 (logical routing) control plane entry combines the routing policy 310 with the network topology of the middlebox being located at Port K. As shown, the logical controller 320 first converts the logical control plane entry 315 to logical forwarding plane entry 325. As described, in some embodiments a table mapping rules engine at the logical controller 320 performs this conversion. That is, the entry 315 is a first database table record, which is mapped via the rules engine to the entry 325. The logical forwarding plane entry 325 is a flow entry in the format of match→action, stating "If source IP matches {A} and Ingress match Port L→forward to Port K". Because the network performs forwarding in the logical plane, the flow entry sends packets to a logical port of the logical router.

Next, the logical controller 320 translates the logical forwarding plane entry 320 into a set of universal control plane entries 330-340. The first entry 330 is the forwarding entry in the universal physical control plane, stating "If match L3 C and source IP match {A} and Ingress match Port L→forward to Port K". This entry adds a match over the L3 router to the forwarding entry, ensuring that a packet acted upon by the flow entry is not part of a different logical network.

In addition, the logical controller adds ingress and egress port integration entries 335 and 340. Because these entries are part of the universal physical control plane, the physical port information in these entries is generic. These entries include an ingress port integration entry 335 that maps packets received via a software port connected to the middlebox in the host machine to the logical ingress Port K. Similarly, the egress port integration entry 340 maps packets forwarded to Port K to the software port connected to the middlebox. As this port may have different specific identifiers in different host machines, at the universal control plane level it is represented using a generic abstraction of such a port. The universal physical control plane will include various other entries, such as ingress mapping to map packets received from a (generic) virtual interface at which VM1 is located to an ingress port on the L2 A logical switch, and a L2 forwarding entry that maps packets with a destination not on the L2 A logical switch to the egress port connected logically to the L3 C logical router.

As with the logical control plane to logical forwarding plane, the logical controller 320 performs the second conversion using a table mapping rules engine. In some embodiments, the first conversion is performed by a control application within the logical controller while the second conversion is performed by a virtualization application. In some such embodiments, these two applications use the same rules engine.

Next, the logical controller 320 identifies which physical controllers in the network control system should receive the universal physical control plane entries. For instance, the ingress and egress port integration entries at the L2 level for a particular virtual machine will only need to be sent to the physical controller that is the master of the node on which the particular virtual machine is hosted. The entries 330 for the L3 router are sent to all of the machines in some embodiments, and therefore the logical controller 320 identifies all of the physical controllers that receive any universal control plane data for the logical network to receive the entries 330-340. On the other hand, in some cases the middlebox may only be implemented at a subset of the nodes (e.g., because the middlebox will only need to process traffic at those nodes), and therefore these entries are only exported to the physical controllers managing nodes in the subset.

Upon receiving the entries 330-340, the physical controller 345 (one of several physical controllers to receive the entries) performs the universal physical control plane to customized physical control plane conversion. As shown, the entry 330 stays the same, as there is no information in the flow entry that requires specification. On the other hand, the generic port abstraction in the ingress and egress port integration entries 335 and 340 are converted into the specific software port of the MSE 350 to which the middlebox connects for entries 355 and 360.

As shown, in some embodiments after negotiating the software port connection with the middlebox, the MSE passes the middlebox attachment port information 365 up to the physical controller 345. The physical controller then uses this information as an input to its table mapping engine that converts the universal physical control plane records into customized physical control plane records. The physical controller passes this information to the MSE, which converts the customized physical control plane entries into physical forwarding plane entries in its forwarding tables 370. These forwarding tables are used by the MSE to match against received packets and perform actions (e.g., forwarding, encapsulation, etc.) on the packets. While not shown here, additional flow entries are generated by the physical controller to add the slicing tag to the packet before sending the packet over the software port to the middlebox.

FIG. 4 conceptually illustrates the same user as in FIG. 3 configuring the Middlebox D of their logical network, and the propagation of the configuration data down to the middlebox. As shown, the same logical network topology 305 is entered, along with a middlebox rule 405. The middlebox rule 405 is entered through a middlebox configuration interface specific to the implementation and middlebox type for the Middlebox D, and specifies a rule for how the middlebox will process packets. For instance, if the middlebox is a firewall, the rule might specify particular source IPs to block or allow; if the middlebox is a source network address translator, the rule might specify a set of real IPs to hide behind a specific virtual IP; if the middlebox is a load balancer, the rule might specify a particular scheduling algorithm to use for load balancing a specific set of servers behind a specific virtual IP; etc.

As shown, the logical controller 320 receives the rule 415 (e.g., as a database table record). The logical controller identifies the particular nodes that should receive the rule 415. In some embodiments, this is all of the nodes that implement Middlebox D, which may be all of the nodes implementing the logical forwarding elements of the network. In some embodiments, however, the logical controller parses the routing policies for the middlebox to determine that only a subset of the nodes implementing the logical forwarding elements need to implement the middlebox (i.e., based on its placement and function in the logical network). Based on the identified nodes, the logical controller identifies a set of physical controllers to which it distributes the rule 415.

This set of physical controllers includes the illustrated physical controller 345, to which it exports the rule 415. As at the logical controller 320, the physical controller 345 does not perform any transformation (or at least only minimal transformation) on the rule 415. However, as the new configuration entails starting up a new virtual middlebox on the middlebox application running on the host machine (e.g., a middlebox daemon), the physical controller assigns a slicing identifier 420 for the middlebox instance.

The physical controller 345 distributes the rule 415 and the slicing identifier 420 to the middlebox 425 on the same host machine as the MSE 350. The middlebox generates a new middlebox instance, and converts the rule 415 (along with other configuration rules received from the physical controller 345) into a compiled set of data plane rules 430 for the middlebox instance. In some embodiments, these data plane rules 430 act effectively as a hardcoded set of forwarding tables for packet processing in the middlebox. In addition, the middlebox 425 adds an entry to its slice binding table 435. For each instance, the middlebox 425 creates its own internal identifier, and stores a binding of this internal ID to the packed slicing ID assigned by the physical controller in the slice binding table 435. Furthermore, as shown, the middlebox would have contracted with the MSE 350 in the host machine to create the software port for transferring packets between the two modules.

FIG. 5 conceptually illustrates a second user configuring a Middlebox H of a second logical network, and the propagation of the configuration data down to the middlebox 425. As shown, the second user enters a logical network topology 505, which is similar in structure to the topology 305, and includes the Middlebox H (which is the same type of middlebox as the first user's Middlebox D). In addition, the second user enters a middlebox rule 510, through a same middlebox configuration interface as the first user. While the second user enters the data on a different physical machine from the first user, as the middlebox type is the same (and uses the same implementation), the users enter data through different copies of the same interface.

As shown, a second logical controller 515 receives the rule 520 (e.g., as a database table record). The logical controller 515 identifies the particular nodes that should receive the rule 520, as in the previous example. In this case, the node with middlebox 425 and MSE 350 hosts virtual machines for both the first and second networks 305 and 505, so the same physical controller 345 that manages that node receives the rule 415.

Because the Middlebox H requires the creation of a new virtual middlebox on the middlebox application 425, the physical controller 345 assigns a new, different slicing identifier 525 for the middlebox instance. The physical controller 345 then distributes the rule 520 and the slicing identifier 525 to the middlebox 425 on the host machine. The middlebox 425 creates a new middlebox instance, and converts the rule 520 (along with other configuration rules received from the physical controller 345) into a new set of data plane rules 530 for the newly created middlebox instance.

In addition, the middlebox 425 adds another entry to its slice binding table 435. As stated above, the middlebox creates its own internal identifier, and stores the binding of this internal ID to the assigned slicing ID from the physical controller 345 in its slice binding table 435. This way, when a packet is received from the MSE 350, the middlebox 425 can remove the slicing identifier and match that identifier with its internal ID in order to use the appropriate set of middlebox rules to process the packet. In addition, when the middlebox creates new states (e.g., for new TCP connections), it uses the internal identifier to associate the state with a particular instance.

The above example relates to a distributed middlebox. For a centralized middlebox, the user enters the configuration in the same manner (through an interface designed for the middlebox). The logical controller identifies only a single physical controller that manages the middlebox (or the host machine at which the middlebox is located, if implemented as a single virtual machine), and exports the configuration rules to this physical controller. The physical controller assigns a slice identifier for the configuration, as the centralized middleboxes may also be virtualized between several networks.

Whereas in the distributed case, only one managed switching element sends packets to a particular distributed middlebox element, in the centralized case numerous different MSEs will need to receive the slicing identifier. As such, in some embodiments, the physical controller managing the centralized middlebox sends the slicing identifier to the logical controller that manages the particular network, which distributes this slicing identifier (e.g., in the form of flow entries that add the identifier to packets destined for the middlebox) to all of the nodes that may send packets to the middlebox (via their managing physical controllers). In other embodiments, the logical controller assigns the slicing identifier for the middlebox and distributes this information to all of the nodes via the managing physical controllers.

In addition, the network control system sets up tunnels between the centralized middlebox and the various managed switching elements that send packets to the middlebox. The tunneling information may be entered by a user at the input translation controller interface, or automatically generated by the logical controller with knowledge of the different tunneling protocols supported by the middlebox. In the conversion to the physical control plane, the logical controller adds tunnel encapsulation flow entries that add or remove tunnel encapsulation from the packet. These entries can then be customized at the physical controller level to account for the particular ports and encapsulation used at each different managed switching element.

II. Network Controller Architecture

Figure 6:
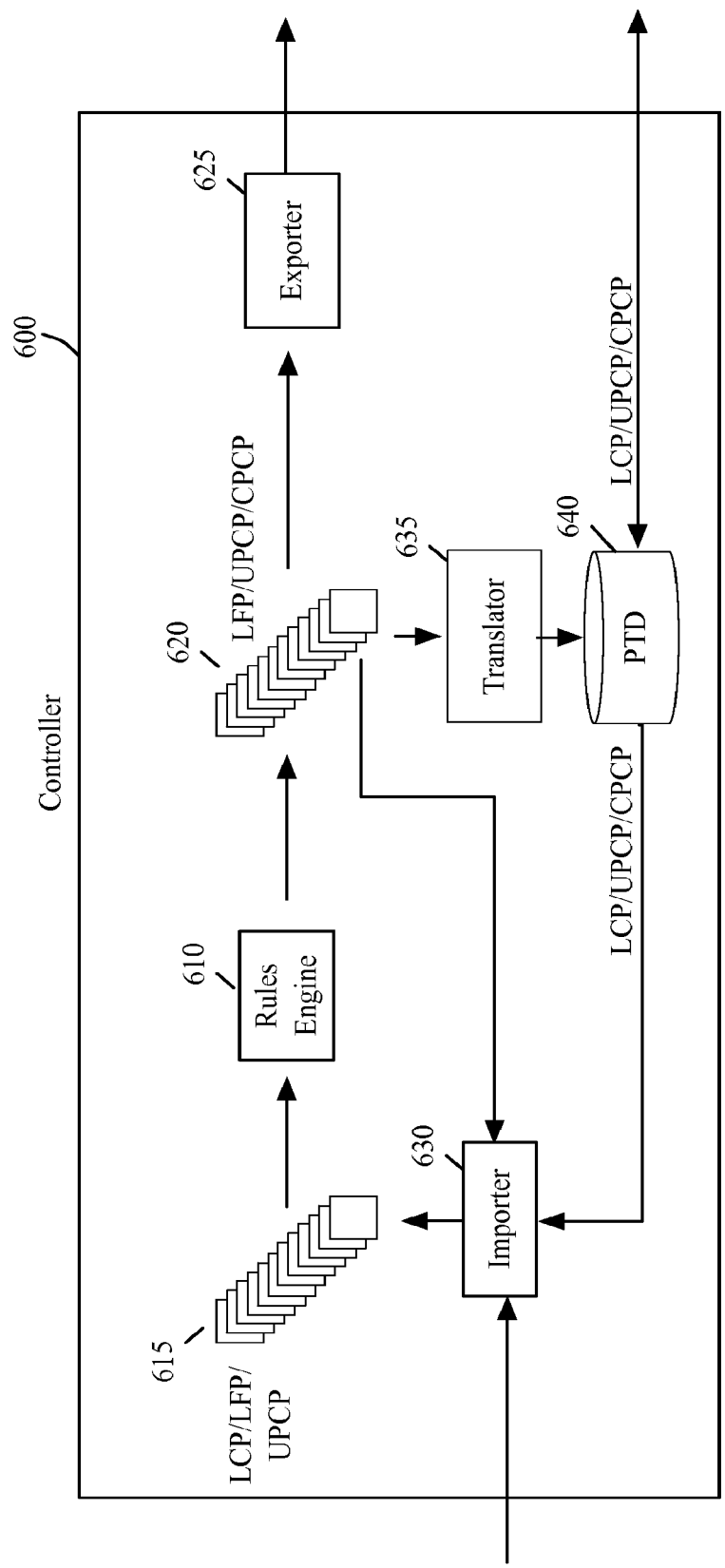
FIG. 6 illustrates example architecture of a network controller of some embodiments.

The above section describes a network control system that includes several different types of network controllers. FIG. 6 illustrates example architecture of a network controller (e.g., a logical controller or a physical controller) 600. The network controller of some embodiments uses a table mapping engine to map data from an input set of tables to data in an output set of tables. The input set of tables in a controller include logical control plane (LCP) data to be mapped to logical forwarding plane (LFP) data, LFP data to be mapped to universal physical control plane (UPCP) data, and/or UPCP data to be mapped to customized physical control plane (CPCP) data. The input set of tables may also include middlebox configuration data to be sent to another controller and/or a distributed middlebox instance. The network controller 600, as shown, includes input tables 615, a rules engine 610, output tables 620, an importer 630, an exporter 635, a translator 635, and a persistent data storage (PTD) 640.

In some embodiments, the input tables 615 include tables with different types of data depending on the role of the controller 600 in the network control system. For instance, when the controller 600 functions as a logical controller for a user's logical forwarding elements, the input tables 615 include LCP data and LFP data for the logical forwarding elements. When the controller 600 functions as a physical controller, the input tables 615 include LFP data. The input tables 615 also include middlebox configuration data received from the user or another controller. The middlebox configuration data is associated with a logical datapath set parameter that identifies the logical switching elements to which the middlebox to be is integrated.

In addition to the input tables 615, the control application 600 includes other miscellaneous tables (not shown) that the rules engine 610 uses to gather inputs for its table mapping operations. These miscellaneous tables include constant tables that store defined values for constants that the rules engine 610 needs to perform its table mapping operations (e.g., the value 0, a dispatch port number for resubmits, etc.). The miscellaneous tables further include function tables that store functions that the rules engine 610 uses to calculate values to populate the output tables 625.

The rules engine 610 performs table mapping operations that specifies one manner for converting input data to output data. Whenever one of the input tables is modified (referred to as an input table event), the rules engine performs a set of table mapping operations that may result in the modification of one or more data tuples in one or more output tables.

In some embodiments, the rules engine 610 includes an event processor (not shown), several query plans (not shown), and a table processor (not shown). Each query plan is a set of rules that specifies a set of join operations that are to be performed upon the occurrence of an input table event. The event processor of the rules engine 610 detects the occurrence of each such event. In some embodiments, the event processor registers for callbacks with the input tables for notification of changes to the records in the input tables 615, and detects an input table event by receiving a notification from an input table when one of its records has changed.

In response to a detected input table event, the event processor (1) selects an appropriate query plan for the detected table event, and (2) directs the table processor to execute the query plan. To execute the query plan, the table processor, in some embodiments, performs the join operations specified by the query plan to produce one or more records that represent one or more sets of data values from one or more input and miscellaneous tables. The table processor of some embodiments then (1) performs a select operation to select a subset of the data values from the record(s) produced by the join operations, and (2) writes the selected subset of data values in one or more output tables 620.

Some embodiments use a variation of the datalog database language to allow application developers to create the rules engine for the controller, and thereby to specify the manner by which the controller maps logical datapath sets to the controlled physical switching infrastructure. This variation of the datalog database language is referred to herein as nLog. Like datalog, nLog provides a few declaratory rules and operators that allow a developer to specify different operations that are to be performed upon the occurrence of different events. In some embodiments, nLog provides a limited subset of the operators that are provided by datalog in order to increase the operational speed of nLog. For instance, in some embodiments, nLog only allows the AND operator to be used in any of the declaratory rules.

The declaratory rules and operations that are specified through nLog are then compiled into a much larger set of rules by an nLog compiler. In some embodiments, this compiler translates each rule that is meant to address an event into several sets of database join operations. Collectively the larger set of rules forms the table mapping rules engine that is referred to as the nLog engine.

Some embodiments designate the first join operation that is performed by the rules engine for an input event to be based on the logical datapath set parameter. This designation ensures that the rules engine's join operations fail and terminate immediately when the rules engine has started a set of join operations that relate to a logical datapath set (i.e., to a logical network) that is not managed by the controller.

Like the input tables 615, the output tables 620 include tables with different types of data depending on the role of the controller 600. When the controller 600 functions as a logical controller, the output tables 615 include LFP data and UPCP data for the logical switching elements. When the controller 600 functions as a physical controller, the output tables 620 include CPCP data. Like the input tables, the output tables 615 may also include the middlebox configuration data. Furthermore, the output tables 615 may include a slice identifier when the controller 600 functions as a physical controller.

In some embodiments, the output tables 620 can be grouped into several different categories. For instance, in some embodiments, the output tables 620 can be rules engine (RE) input tables and/or RE output tables. An output table is a RE input table when a change in the output table causes the rules engine to detect an input event that requires the execution of a query plan. An output table can also be an RE input table that generates an event that causes the rules engine to perform another query plan. An output table is a RE output table when a change in the output table causes the exporter 625 to export the change to another controller or a MSE. An output table can be an RE input table, a RE output table, or both an RE input table and a RE output table.

The exporter 625 detects changes to the RE output tables of the output tables 620. In some embodiments, the exporter registers for callbacks with the RE output tables for notification of changes to the records of the RE output tables. In such embodiments, the exporter 625 detects an output table event when it receives notification from a RE output table that one of its records has changed.

In response to a detected output table event, the exporter 625 takes each modified data tuple in the modified RE output tables and propagates this modified data tuple to one or more other controllers or to one or more MSEs. When sending the output table records to another controller, the exporter in some embodiments uses a single channel of communication (e.g., a RPC channel) to send the data contained in the records. When sending the RE output table records to MSEs, the exporter in some embodiments uses two channels. One channel is established using a switch control protocol (e.g., OpenFlow) for writing flow entries in the control plane of the MSE. The other channel is established using a database communication protocol (e.g., JSON) to send configuration data (e.g., port configuration, tunnel information).

In some embodiments, the controller 600 does not keep in the output tables 620 the data for logical datapath sets that the controller is not responsible for managing (i.e., for logical networks managed by other logical controllers).

However, such data is translated by the translator 635 into a format that can be stored in the PTD 640 and is then stored in the PTD. The PTD 640 propagates this data to PTDs of one or more other controllers so that those other controllers that are responsible for managing the logical datapath sets can process the data.

In some embodiments, the controller also brings the data stored in the output tables 620 to the PTD for resiliency of the data. Therefore, in these embodiments, a PTD of a controller has all the configuration data for all logical datapath sets managed by the network control system. That is, each PTD contains the global view of the configuration of the logical networks of all users.

The importer 630 interfaces with a number of different sources of input data and uses the input data to modify or create the input tables 610. The importer 620 of some embodiments receives the input data from another controller. The importer 620 also interfaces with the PTD 640 so that data received through the PTD from other controller instances can be translated and used as input data to modify or create the input tables 610. Moreover, the importer 620 also detects changes with the RE input tables in the output tables 630.

III. Packet Processing

The above sections describe in detail the creation of flow entries and middlebox configurations for a logical network using a network control system. This data is then used to process and forward traffic within the physical implementation of the network (e.g., by matching packets to flow entries in the managed switching elements, applying the middlebox rules to packets, etc.).

Figure 7:
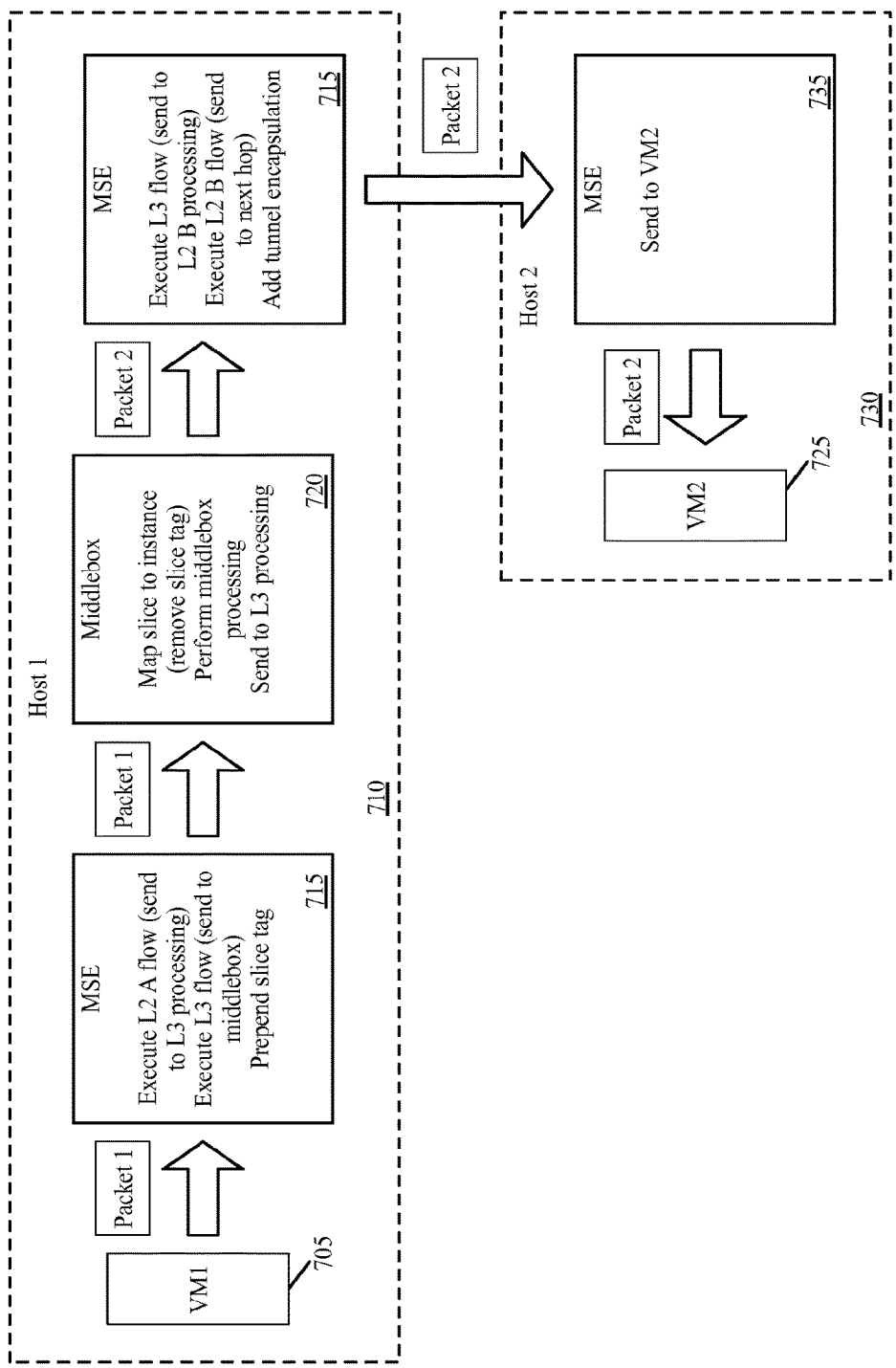
FIG. 7-9 conceptually illustrate different actions performed to send a packet from a first virtual machine to a second virtual machine in some embodiments.

FIG. 7 conceptually illustrates the actions performed to send a packet from a first virtual machine 705 to a second virtual machine 725 in some embodiments. As shown, the VM 705 resides in a first host machine 710, which also includes a managed switching element 715 and a middlebox element 720. The VM 725 resides in a second host machine 730, along with an MSE 735 (and a middlebox element not shown in the figure). In this example, the two virtual machines are located in different logical L2 domains that are connected by a logical L3 router.

The VM 705 sends a packet to the MSE 715 (e.g., through a virtual interface within the host machine 710). The packet has a source MAC and IP address corresponding to VM 705, and a destination IP address (and, if available, destination MAC address) corresponding to VM 725. The MSE 715 begins by executing the L2 flow for logical switch A (the logical switch to which VM 725 attaches), which includes mapping the physical ingress port (the virtual interface) to a logical ingress port, then performing a logical L2 forwarding decision to send the packet to the logical router. This logical router is also implemented by the MSE 715, so sending the packet only involves a resubmit of the packet.

The MSE 715 then executes the L3 flow for the logical router. In some embodiments, the forwarding tables include a flow entry to forward the packet to the logical switch B to which the VM 725 attaches based on the destination IP address. However, the L3 forwarding tables also include a higher-priority entry to forward the packet to the middlebox based on a user-entered routing policy (e.g., based on the source IP address and/or the logical ingress port, or other data). Thus, the L3 forwarding decision is to send the packet to the middlebox 720. Before sending the packet over the software port negotiated between the two software elements, the MSE 715 adds a slice tag to the packet to identify the correct middlebox instance. In some embodiments, the MSE prepends this tag into a particular field of the packet header.

The middlebox 720 receives the packet, and removes the slice tag in order to identify the correct middlebox instance for processing the packet. With the correct instance identified (through the slice binding table), the middlebox performs its processing. This may involve modifying the source IP (for S-NAT), modifying the destination IP (for a load balancer), determining whether to drop or allow the packet (for a firewall), or other process. After performing its processing on the packet, the middlebox sends the packet back to the managed switching element.

In some embodiments, the middlebox sends a new packet back to the MSE. Because the MSE may receive packets from multiple middlebox instances over the same port, in some embodiments the middlebox adds the slice tag to the packet before sending it over the software port. At the MSE 715, the flow entries map the packet back to the logical L3 router (i.e., to the ingress port of the L3 router connected to the middlebox), and then execute the L3 forwarding. Because the logical ingress port is now the port connecting to the middlebox, the routing policy to send to the middlebox is not executed, and the destination IP address results in a forwarding decision to the logical switch B. The logical forwarding decision at this switch is based on the destination MAC address, which results in a forwarding decision to the VM 725. The forwarding decision is used to encapsulate the packet, and also maps to a particular physical port of the host machine, over which the packet is sent (after adding tunneling encapsulation).

The packet traverses the network via the tunnel in order to arrive at the MSE 735 of the second host 730. After removing the tunneling, the MSE 735 reads the egress context, removes it, and delivers the packet to the VM 725. This maps to a virtual interface within the host machine 730 such that the packet arrives at the VM 725.

One of ordinary skill will recognize that this example is only one of numerous possible packet processing examples involving a distributed middlebox. If the destination VM 725 was located in the host 710 along with the source VM 705, the packet would go to the MSE 715, to the middlebox 720, back to the MSE 715, and then to the destination VM 725 without ever leaving the physical machine. As another example, if the middlebox only receives duplicate packets, then the MSE 715 would send the received packet to the second host 730 and a duplicate packet to the middlebox 720, which would not send out a packet after its processing was finished.

Figure 8:
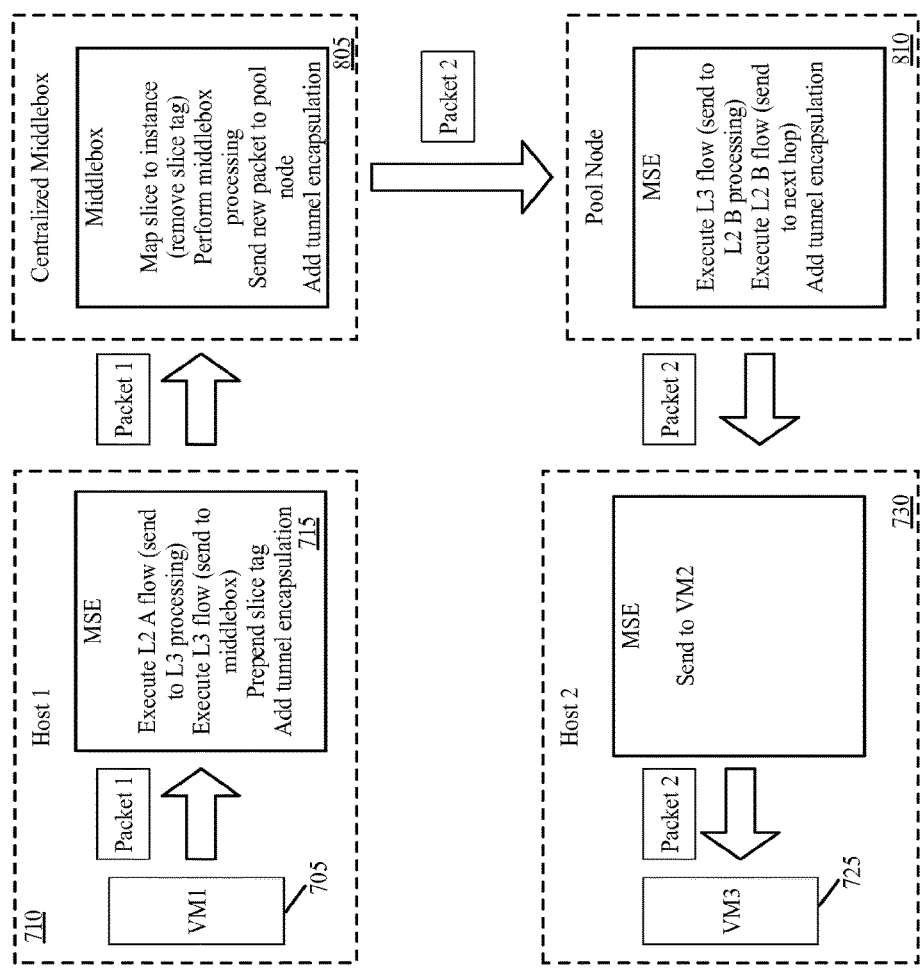

While the example of FIG. 7 illustrates the processing involved in sending a packet to a distributed middlebox, FIG. 8 conceptually illustrates sending a packet through a centralized middlebox located outside of any of the host machines. As shown, in this figure the VM 705 in the host 710 again sends a packet to the VM 725 in the host 730. Upon receiving the packet from the source VM 705, the MSE 715 executes the L2 flow (ingress mapping to the logical ingress port connected to the VM 705, then logical forwarding to the logical L3 router). At the L3 router, the routing policies again send the packet to the middlebox, which in this case is not located within the host 710. As such, the MSE adds the slice tag to the packet (in the same way as if the middlebox was distributed), but also adds tunneling encapsulation to the packet in order to send the packet over the physical network to the centralized middlebox 805.

The centralized middlebox 805 maps the slice identifier to one of its virtual middleboxes (i.e., using its slice binding table), then performs the middlebox processing. Examples of centralized middleboxes include, in some embodiments, firewalls (which may also be distributed), intrusion detection systems (which are passive middleboxes that receive duplicate packets), and WAN optimizers (for performing various data compression techniques before sending packets out over a WAN), as well as other middleboxes. After performing its middlebox processing, the middlebox 805 sends a new packet to a pool node.

In some embodiments, each centralized middlebox sends all of its packets to a particular pool node (or different pool nodes for different middlebox instances), because the middlebox may not have the functionality to perform the logical forwarding required to send the packet to its destination. Thus, the middlebox 805 encapsulates the packet for the tunnel (and, in some embodiments, adds the slice tag to the packet), then sends it to the pool node 810. The pool node 810 maps the packet to the correct logical router, and uses the destination IP address of the packet to make a forwarding decision to the logical switch to which the destination VM 725 connects. The logical L2 flows in the pool node forward the packet to the destination machine 725, and this egress context is used to encapsulate the packet. The pool node 810 then adds the tunnel encapsulation for transport over the physical network, and sends the packet to the host. 730. The MSE 735 reads this egress context, removes it, and delivers the packet to the VM 725 (in the same manner as in FIG. 7).

Figure 9:
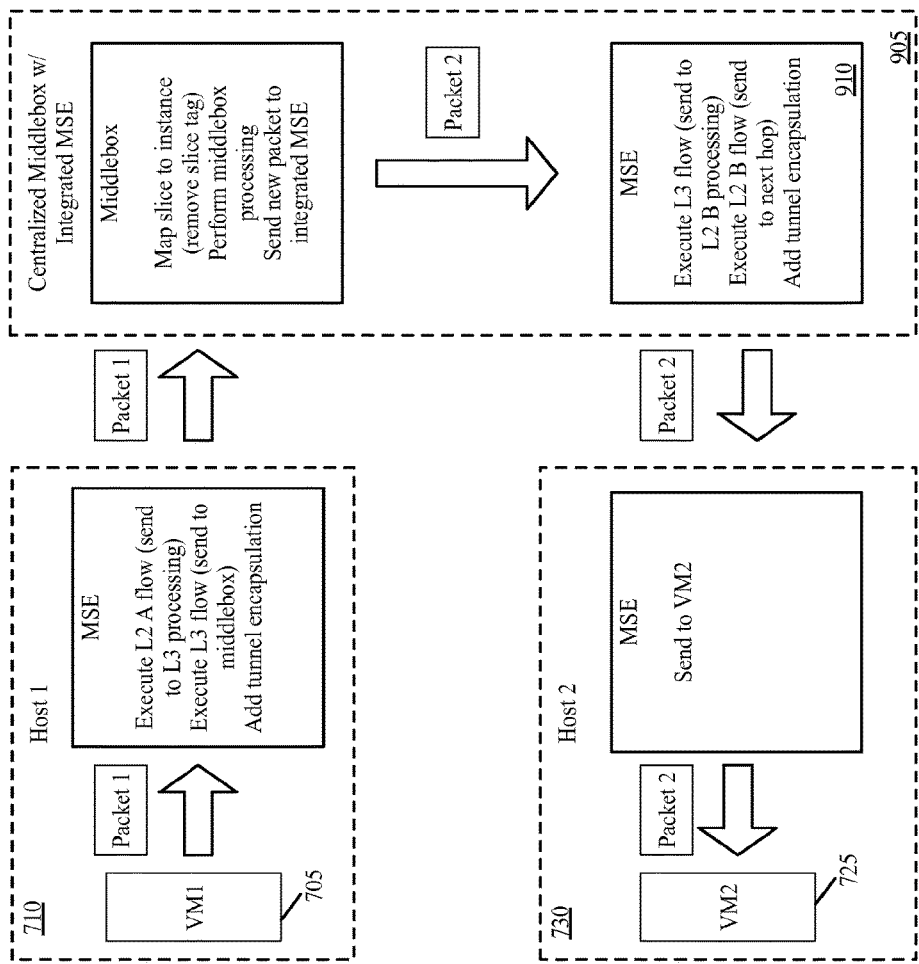

FIG. 9 is a second example of a centralized middlebox 905, in which the centralized middlebox also has a managed switching element 910. In this case, the packet arrives at the centralized middlebox 905 in the same manner as the previous example of FIG. 8, and the middlebox 905 performs the same processing. However, rather than encapsulate the new packet to send over a tunnel, the middlebox processing sends the packet to the integrated MSE 910 (e.g., via a software port similar to those functioning within the host machines). The MSE 910 performs the same processing as the pool node of the previous example, eventually making a logical L2 forwarding decision to send the packet to the VM 725, encapsulating the packet with this egress context (and the tunneling encapsulation), then sending the packet over the network to the host 730. At this point, the processing becomes the same as in FIG. 8.

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 10:
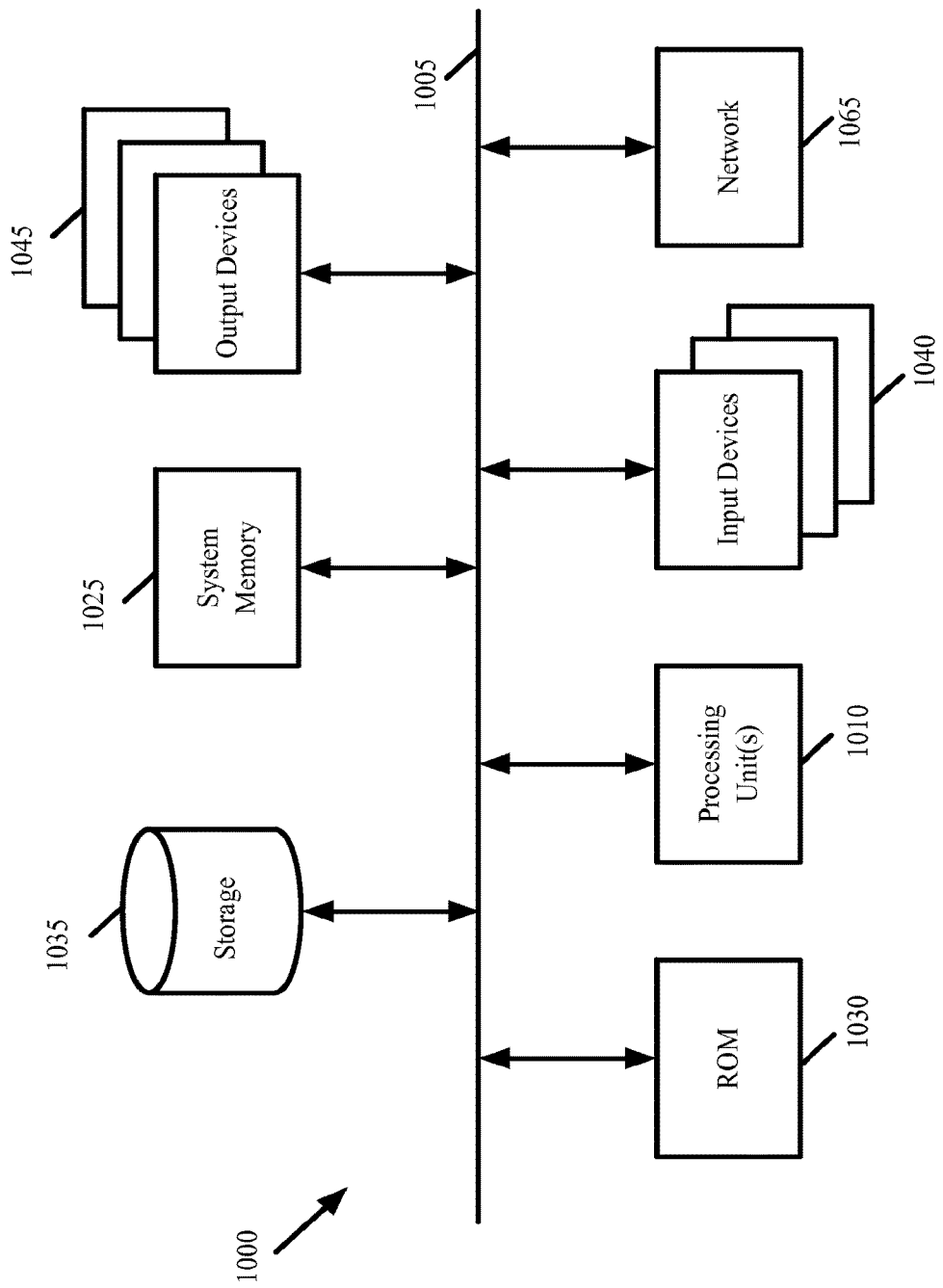
FIG. 10 conceptually illustrates an electronic system with which some embodiments of the invention are implemented.

FIG. 10 conceptually illustrates an electronic system 1000 with which some embodiments of the invention are implemented. The electronic system 1000 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 1000 includes a bus 1005, processing unit(s) 1010, a system memory 1025, a read-only memory 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1030, the system memory 1025, and the permanent storage device 1035.

From these various memory units, the processing unit(s) 1010 retrieves instructions to execute and data to process in order to execute the processes of the invention. The processing unit(s) may be a single processor or a multi-core processor in different embodiments.

The read-only-memory (ROM) 1030 stores static data and instructions that are needed by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1035.

Other embodiments use a removable storage device (such as a floppy disk, flash memory device, etc., and its corresponding drive) as the permanent storage device. Like the permanent storage device 1035, the system memory 1025 is a read-and-write memory device. However, unlike storage device 1035, the system memory 1025 is a volatile read-and-write memory, such a random access memory. The system memory 1025 stores some of the instructions and data that the processor needs at runtime. In some embodiments, the invention's processes are stored in the system memory 1025, the permanent storage device 1035, and/or the read-only memory 1030. From these various memory units, the processing unit(s) 1010 retrieves instructions to execute and data to process in order to execute the processes of some embodiments.

The bus 1005 also connects to the input and output devices 1040 and 1045. The input devices 1040 enable the user to communicate information and select commands to the electronic system. The input devices 1040 include alphanumeric keyboards and pointing devices (also called "cursor control devices"), cameras (e.g., webcams), microphones or similar devices for receiving voice commands, etc. The output devices 1045 display images generated by the electronic system or otherwise output data. The output devices 1045 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 10, bus 1005 also couples electronic system 1000 to a network 1065 through a network adapter (not shown). In this manner, the computer can be a part of a network of computers (such as a local area network ("LAN"), a wide area network ("WAN"), or an Intranet, or a network of networks, such as the Internet. Any or all components of electronic system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A method for performing middlebox operations on a host computer executing a middlebox element having a plurality of middlebox instances and a plurality of end machines, the method comprising:
   receiving a data packet from a managed forwarding element via a software port between the managed forwarding element and the middlebox element having the plurality of middlebox instances, wherein the managed forwarding element executes on the host computer to implement a plurality of logical networks;
   based on a tag that the managed forwarding element associated with the data packet, selecting from the plurality of middlebox instances a particular middlebox instance associated with the tag;
   using the selected middlebox instance to perform a middlebox operation on the received packet; and
   sending the processed data packet to the managed forwarding element.

2. The method of claim 1, wherein the tag identifies the particular middlebox instance, wherein the particular middlebox instance is associated with a particular logical network.

3. The method of claim 2, wherein the managed forwarding element received the data packet from a particular end machine associated with the particular logical network, wherein the managed forwarding element selected the tag based on the particular logical network associated with the data packet.

4. The method of claim 1, wherein the tag is prepended to the data packet by the managed forwarding element.

5. The method of claim 1, wherein selecting the particular middlebox instance comprises mapping the tag to the particular middlebox instance using a binding table.

6. The method of claim 1, wherein sending the processed data packet to the managed forwarding element comprises sending the processed packet with the tag.

7. The method of claim 1, wherein the managed forwarding element sent the data packet to the middlebox element according to a routing policy that routes the data packet based on a data field other than a destination network address of the data packet.

8. The method of claim 7, wherein the data field is an ingress port through which the data packet was received.

9. The method of claim 7, wherein the managed forwarding element receives the processed data packet and subsequently routes the processed data packet based on the destination network address of the processed data packet.

10. A non-transitory machine readable medium storing a program for performing middlebox operations on a host computer executing a middlebox element having a plurality of middlebox instances and a plurality of end machines, the program comprising sets of instructions for:
   receiving a data packet from a managed forwarding element via a software port between the managed forwarding element and the middlebox element having the plurality of middlebox instances, wherein the managed forwarding element executes on the host computer to implement a plurality of logical networks;
   based on a tag that the managed forwarding element associated with the data packet, selecting from the plurality of middlebox instances a particular middlebox instance associated with the tag;
   using the selected middlebox instance to perform a middlebox operation on the received packet; and
   sending the processed data packet to the managed forwarding element.

11. The non-transitory machine readable medium of claim 10, wherein the tag identifies the particular middlebox instance, wherein the particular middlebox instance is associated with a particular logical network.

12. The non-transitory machine readable medium of claim 11, wherein the managed forwarding element received the data packet from a particular end machine associated with the particular logical network, wherein the managed forwarding element selected the tag based on the particular logical network associated with the data packet.

13. The non-transitory machine readable medium of claim 10, wherein the tag is prepended to the data packet by the managed forwarding element.

14. The non-transitory machine readable medium of claim 10, wherein the set of instructions for selecting the particular middlebox instance comprises a set of instructions for mapping the tag to the particular middlebox instance using a binding table.

15. The non-transitory machine readable medium of claim 10, wherein the set of instructions for sending the processed data packet to the managed forwarding element comprises a set of instructions for sending the processed packet with the tag.

16. The non-transitory machine readable medium of claim 10, wherein the managed forwarding element sent the data packet to the middlebox element according to a routing policy that routes the data packet based on a data field other than a destination network address of the data packet.

17. The non-transitory machine readable medium of claim 16, wherein the data field is an ingress port through which the data packet was received, wherein the managed forwarding element receives the processed data packet from the middlebox element and subsequently routes the processed data packet based on the destination network address of the processed data packet.

18. The non-transitory machine readable medium of claim 10, wherein the plurality of logical middleboxes are one of firewalls, network address translators, and load balancers.

* * * * *